US006930704B1

(12) United States Patent
Hamada

(10) Patent No.: US 6,930,704 B1
(45) Date of Patent: Aug. 16, 2005

(54) CAMERA FOR GETTING INFORMATION UPON THREE-DIMENSIONAL SHAPE

(75) Inventor: Masataka Hamada, Osakasayama (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/542,884

(22) Filed: Apr. 4, 2000

(30) Foreign Application Priority Data

Apr. 7, 1999 (JP) ................................. 11-100629

(51) Int. Cl.⁷ .......................................... H04N 13/00
(52) U.S. Cl. ..................................................... 348/42
(58) Field of Search ............................. 348/42, 43, 44, 348/47, 48, 49, 207; 382/154, 276; 345/589; 356/376, 4.07, 623, 613; H04N 13/00

(56) References Cited

U.S. PATENT DOCUMENTS

| | | | | |
|---|---|---|---|---|
| 5,832,106 A | * | 11/1998 | Kim | 382/154 |
| 5,889,582 A | * | 3/1999 | Wong et al. | 356/4.01 |
| 6,031,941 A | * | 2/2000 | Yano et al. | 382/276 |
| 6,049,385 A | * | 4/2000 | Norita et al. | 356/613 |
| 6,075,605 A | * | 6/2000 | Futamura et al. | 356/376 |
| 6,252,623 B1 | * | 6/2001 | Lu et al. | 348/47 |
| 6,346,949 B1 | * | 2/2002 | Fujiwara et al. | 345/589 |
| 6,369,899 B1 | * | 4/2002 | Hamada | 356/603 |

FOREIGN PATENT DOCUMENTS

JP         6-249624         9/1994

OTHER PUBLICATIONS

"Optical Three Dimensional Measurement" (pp. 83-136) by Toru Yoshizawa Mar. 8, 1993 New Technique Communications.

* cited by examiner

*Primary Examiner*—Tung Vo
(74) *Attorney, Agent, or Firm*—Morrison & Foerster LLP

(57) ABSTRACT

A mechanism, employed for a camera, which obtains information upon a three-dimensional configuration and which does not give a user a feeling of unpleasantness. A monitor display device of the mechanism has an image storage device for storing a non-pattern image which has been taken by an image taking device when a patterned light is not projected by a pattern projector. When the patterned light is projected by the pattern projector, the monitor displays the non-pattern image stored on the image storage device, instead of displaying the image with a pattern which has been taken by the image taking device.

13 Claims, 26 Drawing Sheets

K

M  M  M

R Y B M G C R Y B M G C R

CAMERA FOR GETTING INFORMATION UPON THREE-DIMENSIONAL SHAPE

This application is based upon application No. 11-100629 filed in Japan, the contents of which are hereby incorporated by reference.

BACKGROUND OF THE INVENTION

1. Field of the Invention

The present invention relates to a camera for getting information upon three-dimensional shape.

2. Description of the Related Arts

For example, as a method for getting information upon three-dimensional shape, there has conventionally been proposed a method for getting the information from a pair of images that have passed through a plurality of photographing lenses, and there has conventionally been proposed a method for detecting distance distribution by projecting light onto an object (or subject) on the basis of the principle of triangulation, as shown in FIG. 23.

Also, for example, there has been proposed a method for detecting distance distribution by projecting a fringe pattern onto an object and by inputting the fringe pattern by another camera, on the basis of the principle of triangulation, as disclosed in Japanese Laid-Open Patent Publication No. 6-249624.

Also, for example, there has conventionally been proposed a method to seek for an undulation (or up and down) of an object by projecting a lattice pattern onto the object and by observing the object in different angles, in which modified data corresponding to the modified lattice pattern formed in compliance with the undulation of the object is gained (Journal of the Institute of Precision Engineering, 55, 10, 85 (1989)).

Also, for example, there has conventionally been proposed a method for measuring optical distribution by projecting a gray-code pattern with a CCD camera, instead of projecting the lattice pattern, as shown in FIG. 24.

In order to gain the information upon the three-dimensional shape with the aforementioned method, however, there is need of taking (or photographing) a plurality of images, and the process, subsequent to taking the images, of the information is complex. As a result, a longer time is required for an operation to take an image of the object, and/or a longer time is required for processing the information after taking the image. In other words, it is considered that there is no special problem if the aforementioned method is employed for any measuring device; however, it is considered that it is not suitable to apply the method to any camera.

Therefore, as a method for speedily getting the information upon three-dimensional shape with higher precision, for example, there has been proposed the following method therefor.

Namely, as shown in FIG. 25 (Source: "Optical Three-Dimensional Measurement," edited by Toru Yoshizawa, Shin-Gijutsu Communications (or New Technical Communications), page 89, FIGS. 5.2.12a), a stripe pattern is firstly projected onto an object (or subject) to be photographed; and the stripe pattern formed on the object is detected at an angle determined in terms of a design relative to the projected stripe pattern; and then the distance distribution of the object is detected from the deformed image of the stripe pattern in compliance with the unevenness (or irregularity) of the object. That is, with respect to a phase of an image measured at each image point, a shift (or swerve, or change) in phase relative to its original stripe is computed. The phase shift includes information upon the height of the object. In this relation, the distance distribution of the object is sought, or determined, from the phase information and its triangulation information. However, there is need of high precision for the detection. Because there is a limitation in density distribution of the stripe pattern or in light intensity thereof, there has been employed a method for seeking the distance distribution of the object by a plurality of images taken with the position of the stripe pattern being shifted bit by bit. Based upon this method, for example, stripe patterns with four shifts in phase of 0°, 90°, 180° and 270°, are projected. By the way, as a measuring device, there has been conventionally provided a commercial product in which a slitting light is scanned. According to the measuring device, it takes several hundreds of milliseconds to scan the slitting light for the purpose of getting the information upon three-dimensional shape information. Meanwhile, there has conventionally been provided a digital camera in which a plurality of images are consecutively taken in case that the photographing mode is a successively photographing mode and in which the image is recorded (or stored) upon a memory card after the plurality of images are taken (or after the object is successively photographed); however, the digital camera is not a camera for getting information upon three-dimensional shape.

According to the aforementioned method, however, if the stripe pattern which has a plurality of sub-stripes has only one cycle, the density distribution becomes so rough that it is not possible to heighten the precision for getting the information upon three-dimensional shape.

In order to solve this technical problem, there have conventionally been taken measures in which stripe patterns with several cycles are projected onto the object. In this case, however, if the object has a deep distance distribution, it is not possible to identify a particular piece of information upon which particular sub-stripe of the stripe pattern the particular piece of information corresponds to. Namely, in this case, the angle used in the triangulation may be interpreted as a different angle, depending upon a situation in which the particular sub-stripe of the stripe pattern falls upon a particular ordinal number of the plurality of sub-stripes. As a result, a wrong distance distribution is gained.

More specifically, for example, as shown in FIG. 28, a point "A" which is on a fore plane "P1" becomes a piece of information upon the third stripe; on the other hand, a point "B" which is on a rear plane "P2" becomes another piece of information upon the fourth stripe. However, if it is not possible to identify which ordinal number of sub-stripe the particular plane corresponds to, the points "A" and "B" can not be distinguished from each other, only on the basis of information upon the image sensed by its light receiving part.

Furthermore, in case of increasing the number of points for detection by increasing the number of sub-stripes in a particular stripe pattern for the purpose of enhancing the precision in distance distribution, if a particular sub-stripe is wrongly identified in which ordinal number of sub-stripes it corresponds to, there increases the possibility to falsely detect the information upon the three-dimensional shape of the object.

Under the circumstance, for the purpose of reducing such a misdetection of the information thereupon, and for the purpose of increasing the accuracy for identifying any particular sub-stripe of the stripe pattern, applicant has proposed the following improvement of the stripe pattern to be projected (see, for example, Japanese Patent Application No. 11-87124, not laid open yet).

That is, according to the improvement, for example, a pattern having a plurality of frequencies, and/or a pattern having a plurality of codes and stripes, and/or a light having a colored pattern is/are projected onto an object. Further, according to the improvement, not only such a pattern with a gradation, but also a marker to be able to identify a particular position or location on the pattern, are projected onto the object.

Meanwhile, generally, image taking devices and apparatuses have monitors (or monitoring devices) for letting their users confirm an image of the object (or subject) which has been photographed.

If the monitor applies to the camera for getting information upon three-dimensional shape in which the stripe pattern as aforementioned, is projected onto an object, and if the monitor is kept on all the time so as to allow the user to monitor the image of the object any time, applicant has found the following problem.

Namely, if such a stripe pattern is projected onto the object, the image of the object displayed on the monitor of the camera often becomes an image which gives the user (or photographer) a feeling of unpleasantness, as shown in FIG. 25.

In other words, applicant has found that:
(1) In order to gain information upon three-dimensional shape with higher precision or accuracy, it is necessary, for example, to change a stripe pattern, and/or to increase the number of sub-stripes in the stripe pattern, and/or to make the stripe pattern complex, and/or to add a marker to the stripe pattern, and/or to add some color to the marker etc.
(2) However, as the stripe pattern is more and more improved in order to gain information upon three-dimensional shape with higher precision or accuracy, the image which is displayed on the monitor of the camera becomes complex in inverse proportion to such improvements, which in turn gives the user a feeling of unpleasantness.

SUMMARY OF THE INVENTION

Therefore, an object of the present invention is to provide a camera for getting information upon three-dimensional shape, in which a stripe pattern is projected to an object, and in which the image of the object displayed on the monitor is not an image which gives the user a feeling of unpleasantness.

In accomplishing this and other objects of the present invention, in accordance with one aspect thereof, there is provided a camera for getting information upon three-dimensional shape, comprising: an image taking device for taking an image of an object within a region to be photographed; a projector for projecting a pattern light (or a light with a pattern) on the region; and a monitor for displaying the image of the object which the image taking device takes, in which the monitor has a memory for storing the image of the object the image taking device takes when the projector does not project the pattern light on the region, wherein the image taking device takes a projection pattern which is formed on the object within the region by the pattern light that the projector projects, and wherein the monitor displays the image, stored in the memory, of the object, instead of the image of the object the image taking device takes with the projector projecting the pattern light on the region.

The image of the object which is taken by the image taking device with a pattern light being projected on the object by the projector, is such an image as is formed by adding a pattern to a common natural image. If such an image is directly displayed on the monitor, the image may give its user (or photographer) a feeling of unpleasantness because the image includes the pattern.

According to the one aspect of the present invention, however, the monitor displays a common natural image (i.e. image without the pattern) which has been stored in the memory. Namely, such an unnatural image as gives the user the feeling of unpleasantness is not displayed on the monitor.

Meanwhile, if the monitor displays no image at all at time of taking the image of the object (i.e. at time of photographing the object), the user may feel uneasy about the operation of the camera.

According to the one aspect thereof, however, the image of the object which has been stored in the memory prior to taking the image thereof is displayed on the monitor. Therefore, with this operation, the user is not given such a feeling of uneasiness.

Regarding the pattern light with which the resulting photographed image is not displayed on the monitor, there are, for example, two types of the pattern light as follows.

That is, one of the two types of the pattern light is the light which is not a uniform light and has a distribution of illuminance, wherein the projection pattern which is formed on the object within the region by the pattern light comprises at least one stripe.

The image of the object to which the pattern is added by projecting the pattern light comprising the at least one stripe onto the object is not displayed on the monitor.

And, the other of the two types of the pattern light is the light which comprises a colored light, wherein the projection pattern which is formed on the object within the region by the pattern light comprises a colored part.

The image of the object to which the pattern is added by projecting the pattern light comprising the colored light onto the object is not displayed on the monitor.

In accomplishing the aforementioned objects of the present invention, in accordance with another aspect thereof, there is provided a camera which is able to get information upon a three-dimensional shape of an object, comprising: a projector for projecting a light having a predetermined pattern on the object; a photographing part for photographing the object; a memory for storing an image of the object which the photographing part photographs, in a state in which the projector does not project the light having the predetermined pattern on the object; and a display part for displaying the image, stored in the memory, of the object, instead of the image of the object the photographing part photographs while the projector projects the light having the predetermined pattern on the object.

In accomplishing the aforementioned objects of the present invention, in accordance with still another aspect thereof, there is provided a camera which is able to get information upon a three-dimensional shape of an object, comprising: an image taking part for successively taking an image of the object; a first memory for successively and temporarily storing the image of the object the image taking part takes; a display part for renewing and displaying the image of the object successively; and a projector for projecting a light with a predetermined pattern on the object, wherein the display part displays the image of the object stored in the first memory prior to a projection of the light with the predetermined pattern by the projector, instead of the image of the object the image taking part takes, when the image taking part takes the image of the object in a state in which the projector projects the light with the predetermined pattern.

BRIEF DESCRIPTION OF THE DRAWINGS

This and other objects and features of the present invention will become clear from the following description taken in conjunction with a preferred embodiment thereof and a plurality of modifications to the preferred embodiment with reference to the accompanying drawings, in which:

FIG. 8b is a constitutional view, as a top view, of the stripe pattern projecting part of FIG. 8a;

FIG. 9a is a constitutional view, as a front view, of a stripe pattern projecting part according to a modification to the stripe pattern projecting part shown in FIG. 8a;

FIG. 9b is a constitutional view, as a top view, of the stripe pattern projecting part shown in FIG. 9a;

FIG. 10a is a constitutional view, as a front view, of a stripe pattern projecting part, employing a plurality of light emitting diodes, according to still another modification to the stripe pattern projecting part shown in FIG. 8a;

FIG. 10b is a constitutional view, as a top view, of the stripe pattern projecting part shown in FIG. 10a;

FIG. 11a is an explanatory view showing a stripe pattern, including a plurality of sub-stripes, which corresponds to a mask "s" of a stripe pattern projecting part shown in FIG. 8a;

FIG. 12a is an enlarged view of the stripe pattern shown in 11a;

FIG. 12b is a graph showing a relation between density and position of the stripe pattern shown in FIG. 12a;

FIG. 13b is a graph showing density of the stripe pattern of FIG. 13a;

FIG. 14a is an explanatory view of a stripe pattern according to a modification, in which the stripe pattern corresponds to a mask "s" of the stripe pattern projecting part shown in FIG. 8a;

FIG. 14b is a graph showing a relation between density and position of the stripe pattern shown in FIG. 14a;

FIG. 15a is an explanatory view of a stripe pattern according to a modification, in which the stripe pattern corresponds to a mask "t" of the stripe pattern projecting part shown in FIG. 8a;

FIG. 15b is a graph showing a relation between density and position of the stripe pattern shown in FIG. 15a;

FIG. 16a is an explanatory view of a stripe pattern according to another modification, in which the stripe pattern corresponds to a mask "t" of the stripe pattern projecting part shown in FIG. 8a;

FIG. 16b is a graph showing a relation between density and position of the stripe pattern shown in FIG. 16a;

DETAILED DESCRIPTION OF THE PREFERRED EMBODIMENT

Figure 1:
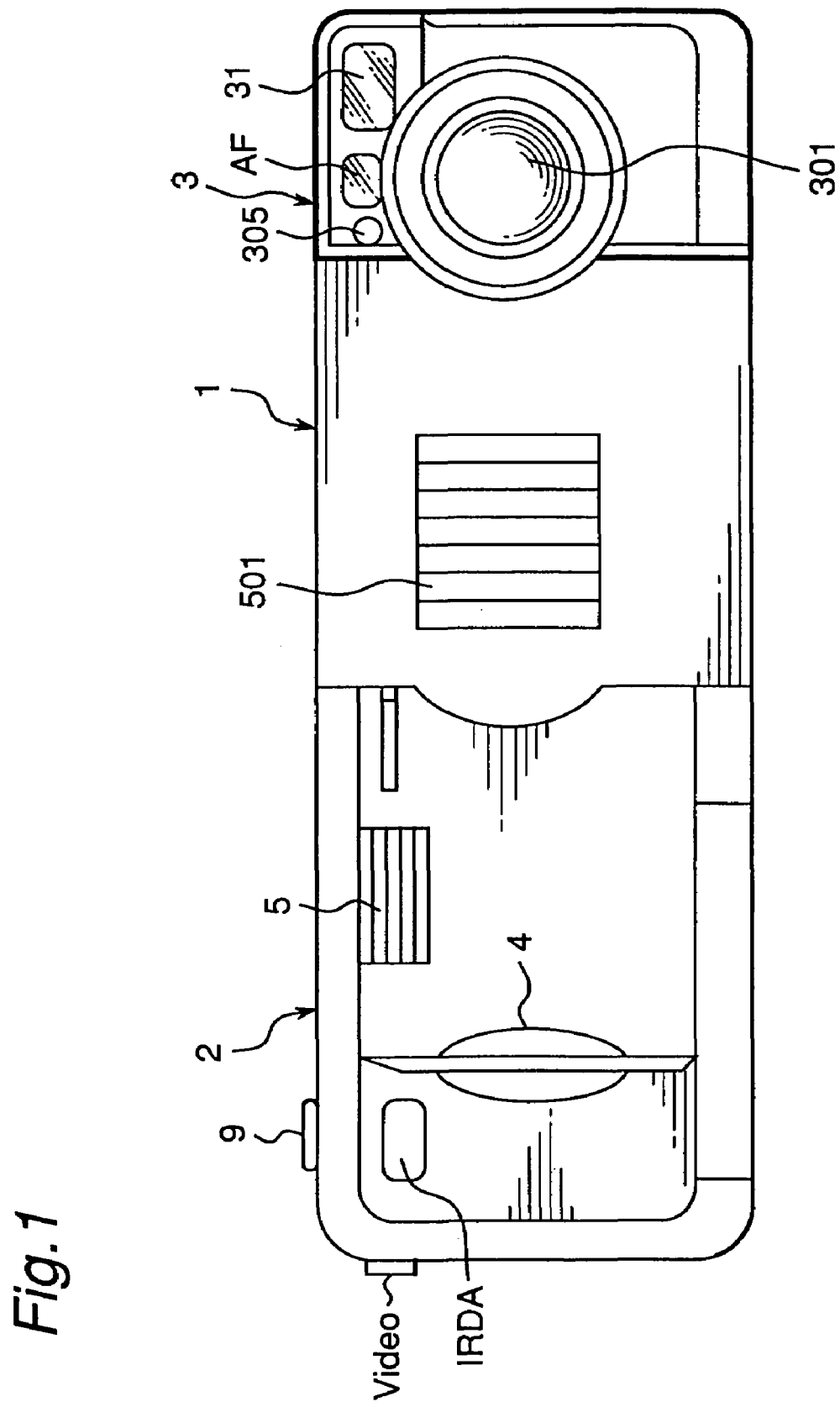
FIG. 1 is a front view of a camera for getting information upon three-dimensional shape, according to the preferred embodiment of the present invention.

Before the description of the preferred embodiment, and the modifications to the preferred embodiment, proceeds, it is to be noted that like or corresponding parts are designated by like reference numerals throughout the accompanying drawings.

With reference to FIGS. 1 through 22, a description is made below in detail upon a camera for getting information upon three-dimensional shape (hereinafter, also referred to as a "3D camera"), according to the preferred embodiment, and to the modifications to the preferred embodiment, of the present invention.

The 3D camera, as shown in a front view of FIG. 1, has a stripe pattern projecting part 1, a box-type camera body 2, and a rectangular-parallelopiped image taking part 3 as shown by a bold line in the figure. The image taking part 3 is removably attached on a right hand side of the stripe pattern projecting part 1, as viewed from a front side of the 3D camera.

Figure 5:
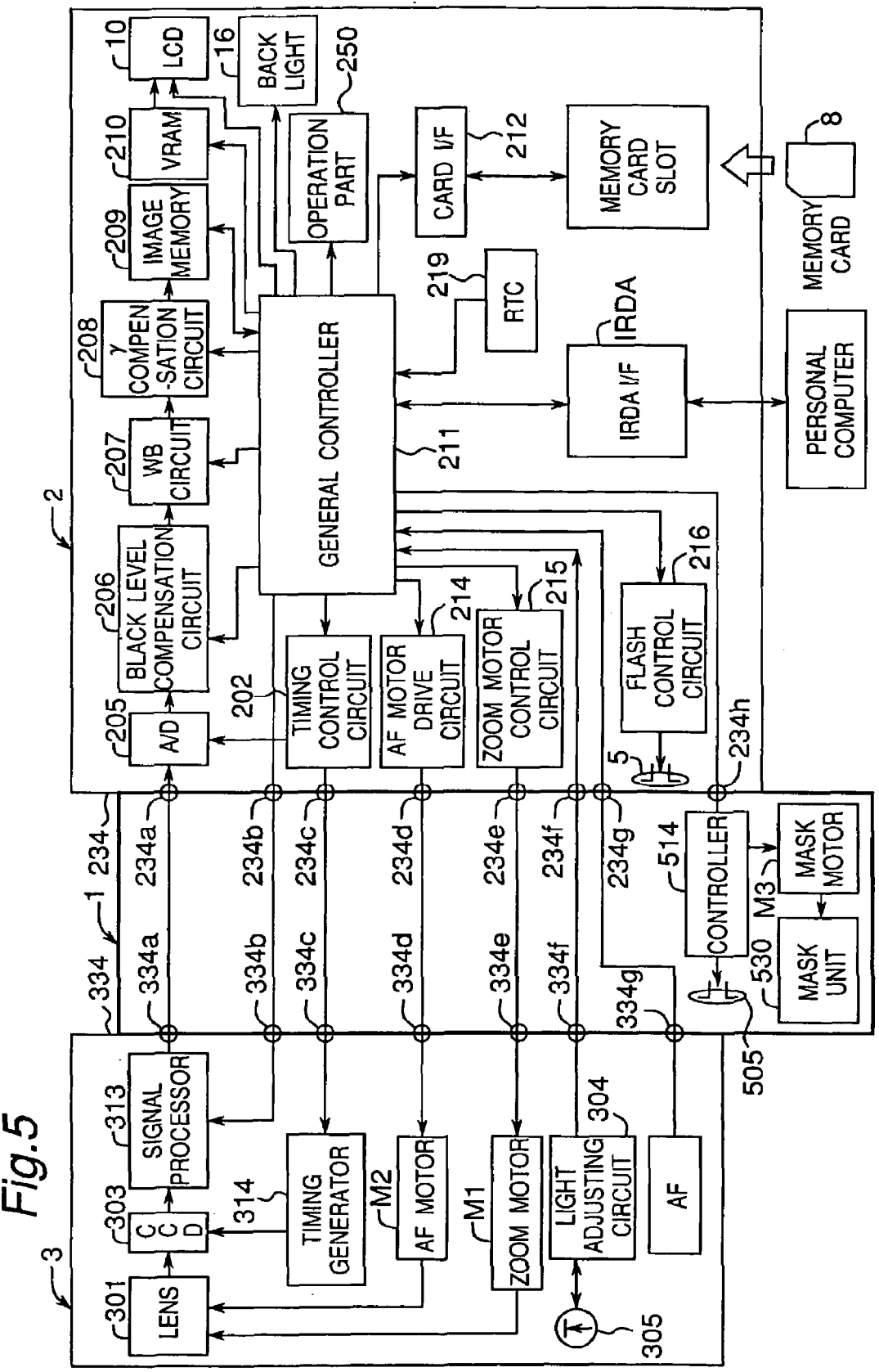
FIG. 5 is a block diagram of a circuit of the camera of FIG. 1.

The image taking part 3 has an image taking circuit with a CCD color area sensor 303 (see FIG. 5). The CCD color area sensor 303 is positioned at a predetermined location behind a zoom lens 301, as a photographing lens, with a macro-function.

The image taking part 3 of the 3D camera has a light adjusting circuit 304 (see FIG. 5) which includes a sensor 305 for sensing a light reflected by an object (or subject) to be photographed when a flash light is emitted, like an ordinary camera employing a silver halide film. The image taking part 3 thereof also has a focussing sensor AF which measures a distance up to the object, and has an optical viewfinder 31.

Meanwhile, inside a body of the image taking part 3, there are provided a zoom motor M1 (see FIG. 5) for changing the focal length of the zoom lens 301 and for moving the lens between a housing position and an exposure position, and a motor M2 (see FIG. 5) for focusing the photographing lens.

On a front surface of the camera body 2, there is provided a grip part 4 on a predetermined left portion thereof. On the front surface of the camera body 2; there is provided a built-in type of flash device 5 on a predetermined upper right portion thereof; and there is provided an IRDA port for performing infrared communications between the 3D camera and any external equipment, such as another 3D camera and a personal computer, thereon. Also, there is provided a shutter button 9 on top of the camera body 2, as shown in the figure.

The stripe pattern projecting part 1 is located between the camera body 2 and the body of the image taking part 3, where a stripe pattern projector 501 is provided. The stripe pattern projector 501 is so arranged that a center of the stripe pattern generally corresponds, in height, to a center of the optical axis of the zoom lens 301. In this arrangement, a plurality of sub-stripes of which the stripe pattern is composed, extend in a direction perpendicular to a direction in which the sub-stripes are away from the optical axis. Because information upon three-dimensional shape is fundamentally gained from the principle of triangulation, this arrangement is intended to realize higher precision for gaining the information thereupon by making a base line longer, and is also intended to cover the object with a relatively small stripe pattern in comparison with an arrangement in which the sub-stripes are directed with an offset therebetween or in which the sub-stripes are directed at an angle other than the perpendicular angle.

In this embodiment, a flash light is employed for the purpose of projecting the stripe pattern. As will be described later as a modification to this embodiment, a light from a lamp may be selectively employed for projecting the stripe pattern.

The stripe pattern is provided by employing a film. Selectively, the stripe pattern may be provided by employing a glass substrate on which a particular stripe pattern is formed with some pigment(s), dye, etc.

Figure 2:
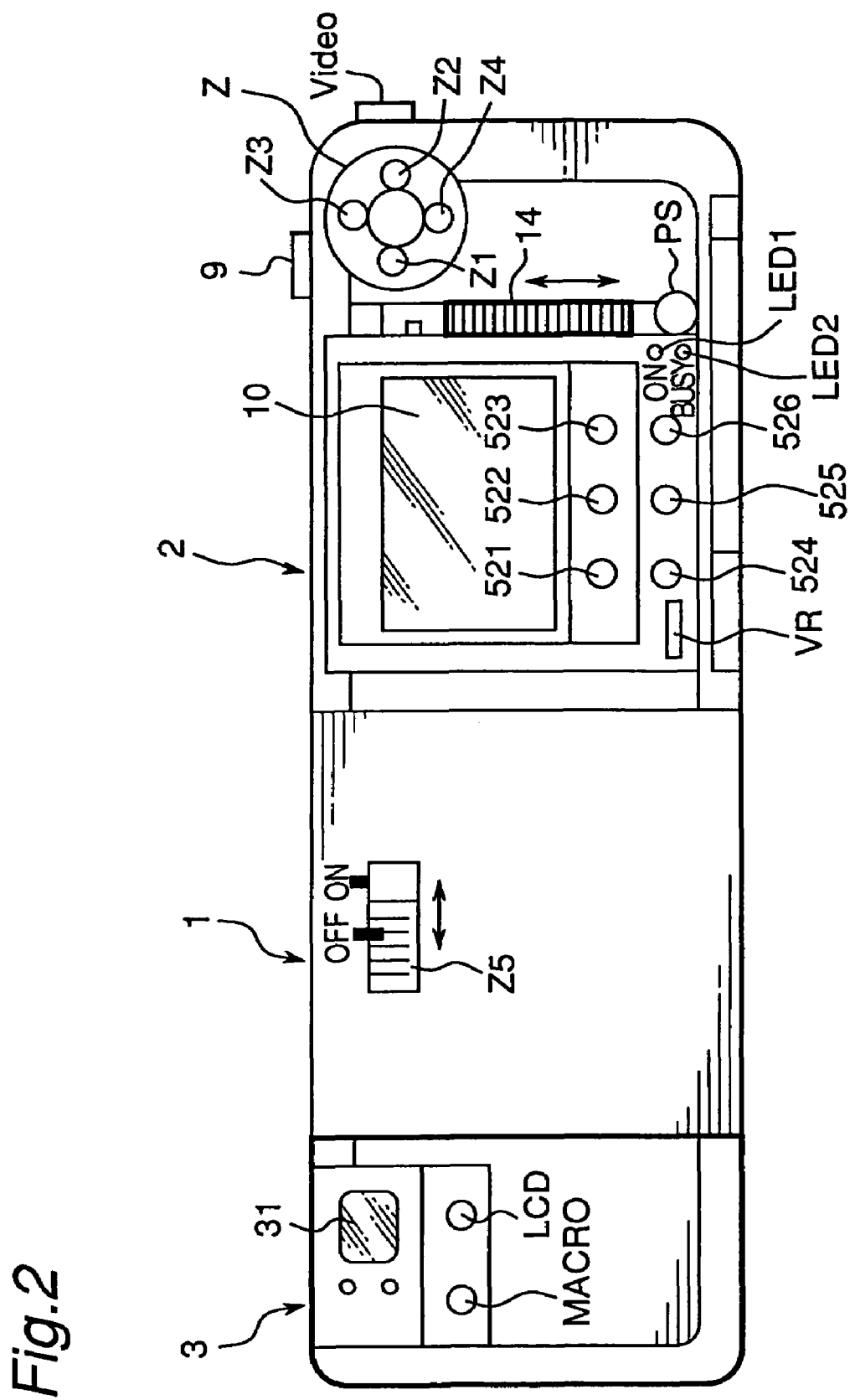
FIG. 2 is a rear view of the camera of FIG. 1.

As shown in a rear view of FIG. 2, on a rear face of the camera body 2, there is provided an LCD display 10 for monitoring an image of the object, and for reproducing the image which has been recorded, etc. This LCD display 10 also functions as a viewfinder.

Under the LCD display 10, there are provided a plurality of key switches 521–526 for manipulating (or operating) the 3D camera, and a power switch PS for the camera body. On a left side of the power switch PS, there are provided an LED 1 which is lit when the power switch PS is turned ON, and a "BUSY" display LED 2 for displaying an input-disabled state of the camera owning to any ongoing access to a memory card of this 3D camera or owning to any preparation for photographing.

Further, on the rear face of the camera body 2, there is provided a switch 14 for setting an "exposure mode" and a "reproduction mode". The exposure mode is a mode for taking a photograph, and the reproduction mode is a mode for reproducing and displaying the image recorded on a memory card 8 (see FIG. 5) on the LCD display 10. The exposure/reproduction mode setting switch 14 is constituted by a two-contact slide switch. For example, when the exposure/reproduction mode setting switch 14 is slid downwards, the reproduction mode is set; on the other hand, when the mode setting switch 14 is slid upwards, the exposure mode is set.

Also, on an upper right part of the rear surface of the camera, there is provided a four-button switch (four-interlocking switch) Z. Pressing buttons Z1 and Z2 causes the zoom motor M1 (see FIG. 5) to be actuated, and pressing buttons Z3 and Z4 allows an operation to compensate its exposure to be executed.

On the rear surface of the image taking part 3, there is provided an LCD button for switching ON and OFF of the LCD display. Each time this button is pressed in, the ON/OFF state of the LCD display is changed over. For example, when only the optical viewfinder 31 is used for photographing, the LCD display is kept OFF for the purpose of saving electricity from the electric power.

At time of taking a macro-photo, by pressing a MACRO button in, the focus motor M2 is driven so that the photographing lens (i.e. zoom lens) 301 goes ready for taking the macro-photo.

On a rear surface of the stripe pattern projecting part 1, there is provided a 3D flash power switch Z5, which is the switch for projecting a stripe pattern.

Figure 3:
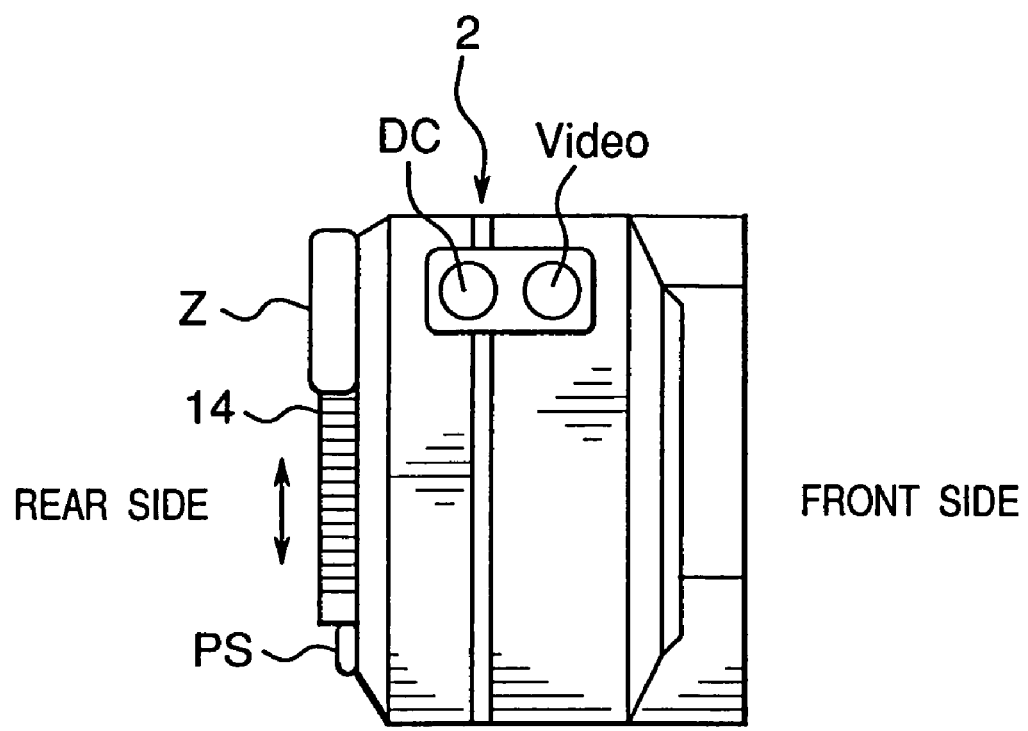
FIG. 3 is a left side view of the camera of FIG. 1.

As shown in a side view of FIG. 3, there are provided a DC input terminal, and a video output terminal for outputting the image formed on the liquid crystal display (i.e. LCD) to an external video monitor, on a side surface of the 3D camera body 2.

Figure 4:
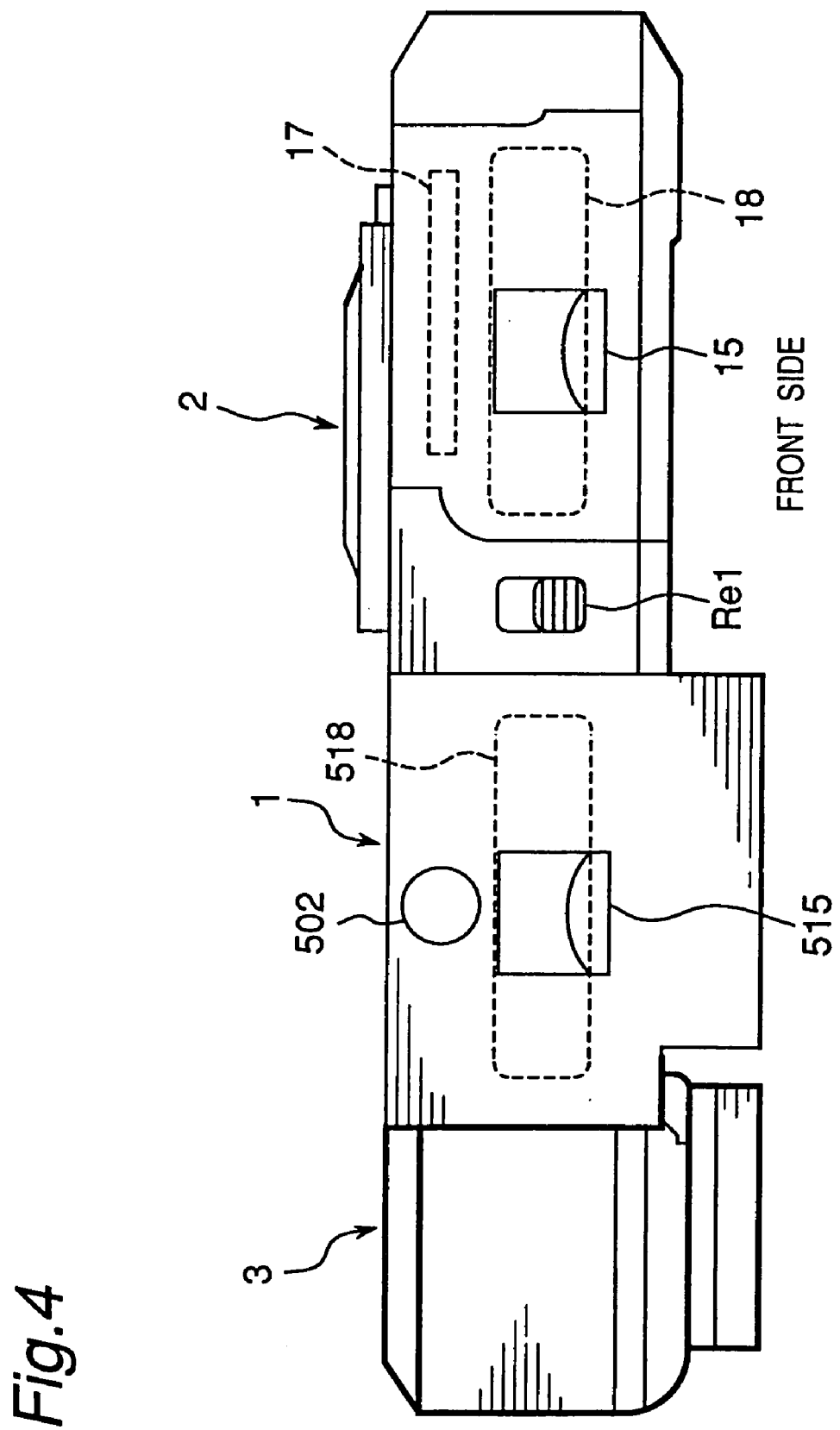
FIG. 4 is a bottom view of the camera of FIG. 1.

As shown in the bottom view of FIG. 4, there are provided a battery loading chamber 18 and a card loading chamber 17 for the memory card 8, on a bottom surface of the camera body 2. An opening part of the battery loading chamber 18 can be closed by a clamshell type lid 15. The 3D camera of the embodiment employs, as a drive source, a plurality of power supply batteries, which are four "AA" type dry cells. Also on a bottom surface, there is provided a release lever Re1 for releasing an engagement between the image taking part 3 and the camera body 2, which are connected to each other by a connector and a hook-shaped connection fitting.

On the bottom surface of the stripe pattern projecting part 1, there is provided a battery loading chamber 518 and a lid 515, as in the camera body 2. Namely, the power source of the stripe pattern projecting part 1 (i.e. the batteries housed inside the battery loading chamber 518) is different from the power source of the camera body 2 (i.e. the batteries housed inside the battery loading chamber 18).

Also, there is provided a tripod screw 502 on the bottom surface of the stripe pattern projecting part 1. The tripod screw 502 is mounted on the stripe pattern projecting part 1 which locates at a central portion of the 3D camera, considering a balance of weight of the camera.

Next, with reference to a block diagram shown in FIG. 5, it is explained about an electrical circuit of the 3D camera.

That is, a CCD 303 photoelectrically converts an optical image of the object formed by the macro-zoom lens 301 into an image signal of R (red), G (green) and B (blue) color components (i.e. a signal being composed of a signal train of pixel signals optically received by individual pixels), and it outputs the electrical signal corresponding to the image signal thereof. A timing generator 314 generates various kinds of timing pulses for controlling to drive the CCD 303.

Regarding the exposure control in the image taking part 3, the aperture is a fixed aperture. Therefore, the exposure amount of the CCD 303 is adjusted by the charge storage time of the CCD 303 corresponding to the shutter speed. In case that it is not possible to set any appropriate shutter speed under a situation in which a brightness of the object is relatively low, improper exposure due to a lack of brightness is compensated by adjusting the level of the image signal outputted from the CCD 303.

That is, at time of low brightness, its exposure control is performed in combination of shutter speed and gain adjustment. The level adjustment of the image signal is carried out at a gain control part in AGC circuit, as explained below, within a signal processor circuit ("SIGNAL PROCESSOR" in the figure) 313.

A timing generator 314 generates a drive control signal for the CCD 303, on the basis of a reference clock (or standard clock) transmitted from a timing control circuit 202 provided on a side of the camera body 2. The timing generator 314, for example, generates clock signals, such as timing signals to make an operation of integration start and end (i.e. to make the operation of exposure start and end), and reading-out control signals (horizontal synchronizing signals, vertical synchronizing signals, transfer signals, etc.) for photodetection signals (or light receiving signals) of the individual pixels. These signals are outputted to the CCD 303.

The signal processing circuit 313 performs the predetermined operation to process analog signals relative to the image signals (analog signals) which are outputted from the CCD 303. The signal processor 313, having a CDS (i.e. Correlational Double Sampling) circuit and an AGC (Auto Gain Control) circuit, performs the operation to reduce noise of image signals by the CDS circuit. Also, the signal processor 313 adjusts the level of image signals by adjusting the gain of the AGC circuit.

A light adjusting circuit 304 controls the amount of light emission of the built-in flash device 5 at time of flash photographing to a predetermined amount of light emission which is set by a general controller 211 of the camera body 2. In the flash photographing, any light, of the flash light, reflected on the object, is received by the sensor 305 simultaneously with a start of exposure. And when the amount of the light thus received by the sensor 305 reaches a predetermined amount, a light-emission stop signal is outputted from the light adjusting circuit 304 to an FL control circuit provided within the general controller 211. The FL control circuit forcedly stops the light emission of the built-in flash device 5 in response to the light emission stop signal. On the basis of the control, the amount of light emission from the built-in flash device 5 is controlled to a predetermined amount.

The information upon the three-dimensional shape, as will be explained later, is gained from a pair of images taken by a pair of flash emissions. Namely, one of the pair of images is an image taken by a projection with a stripe pattern, and the other thereof is an image taken by a projection without the stripe pattern. Ideally, the fundamental light intensity (see FIG. 27) for the pair of flash-photographing images is constant.

When the phase information (or information upon phase) is taken out from the information upon the stripe pattern, the information upon the fundamental light intensity must be removed. And when the pair of flash-photographing images are taken, or photographed, the time of the flash emission is made constant, without independent control, or separate control, to perform the light adjustment for each of the pair of images. By the way, the light adjustment itself to the flash device is controlled by the general controller 211 of the camera body 2.

As shown in FIG. 5, the image taking part 3 and the camera body 2 as described above, are electrically connected to each other through seven groups of connecting terminals 334a–334g provided on a mounting surface of the image taking part 3 and through seven groups of connecting terminals 234a–234g provided on a connecting surface 233 of the camera body 2, via the stripe pattern projecting part 1. Also, the stripe pattern projecting part 1 and the camera body 2 are electrically connected to each other through a connecting terminal 234h.

Next, it is explained about a plurality of internal blocks on the side of the camera body 2.

In the camera body 2, an A/D converter 205 converts each pixel signal of the image signal into a 10-bit digital signal.

Further, within the camera body 2, there is provided a timing control circuit 202 for generating a reference clock (or standard clock), relative to the aforementioned reference clock (or standard clock), the timing generator 314 and the A/D converter 205. The timing control circuit 202 is controlled by the controller 211.

A black level compensation circuit 206 is the circuit to compensate the black level of pixel signals (hereinafter, referred to as "pixel data") converted from its analog form to digital form, to a reference black level (or standard black level). A WB circuit 207 performs an operation of level conversion of pixel data of R, G and B color components, respectively, so that white balance is also adjusted together after an operation of γ-compensation is carried out. The WB circuit 207 converts the level of pixel data of R, G, B color components by employing a level conversion table which is inputted from the general controller 211. In addition, conversion factors (gradients of characteristics) of individual color components of the level conversion table are set, for individual images to be photographed, by the general controller 211.

A γ-compensation circuit 208 is the circuit for compensating γ-characteristics of pixel data.

An image memory 209 is the memory for storing therein pixel data which is outputted from the γ-compensation circuit 208. The image memory 209 has a storage capacity which corresponds to one frame. That is, if the CCD 303 has a plurality of n-row and m-column pixels, the image memory 209 has a storage capacity of image data corresponding to the n×m pixels, in which each pixel data is stored at its corresponding pixel location therein.

A "VRAM" 210 is a buffer memory for image data to be reproduced and displayed on the LCD display 10. The VRAM 210 has a storage capacity of image data corresponding to the number of pixels on the LCD display 10.

In the exposure standby state, pixel data of images which are photographed every 1/30 second by the image taking part 3 are rendered to a predetermined signal process by the A/D converter 205 through the γ-compensation circuit 208, and then they are stored into the image memory 209. At the same time, the pixel data of the image are transferred to the VRAM 210 via the general controller 211, so that they are displayed on the LCD display 10. Due to the display of the image on the LCD display 10, the photographer can view an image of the object.

On the other hand, in the reproduction mode, an image read out from the memory card 8 is first rendered to a predetermined signal process by the general controller 211, and then it is transferred to the VRAM 210, so that the image is reproduced and displayed on the LCD display 10.

A card I/F 212 is an interface for performing writing-in and reading-out of the image data with respect to the memory card 8.

A flash control circuit 216 is the circuit for controlling light emission of the built-in flash device 5. The flash control circuit 216 controls to emit, and not to emit, the flash light, and controls the amount of the light emission, the timing thereof, and the like of the built-in flash device 5, on the basis of a control signal outputted from the general controller 211. The flash control circuit 216 controls the amount of the light emission of the built-in flash device 5 on the basis of a light emission stop signal STP which is inputted from the light adjusting circuit 304.

An "RTC" 219 is a clock circuit for managing date and time when the objectt is photographed. The RTC 219 is driven by an unshown separate power supply.

On an operation part 250 in FIG. 5, the aforementioned various types of switches and buttons are arranged.

The shutter button 9 is a two-step switch which can detect a half-pressed-in state (S1) and a full-pressed-in state (S2), as is adopted in a camera employing a silver halide film. When the shutter button 9 is pushed and kept in the half-pressed-in state "S1" with the 3D camera being in the standby state, the distance information (or information upon distance) is inputted to the general controller 211 on the basis of the focussing information derived from the focussing sensor AF (see FIG. 5). In accordance with instructions from the general controller 211, the AF motor M2 is driven so that the photographing lens 301 is moved to its focusing position.

The general controller 211, which includes a microcomputer, controls to drive the individual members and components mounted inside the image taking part 3 and inside the camera body 2, thereby controlling the image taking operation (or photographing operation) of the 3D camera 1.

Figure 6:
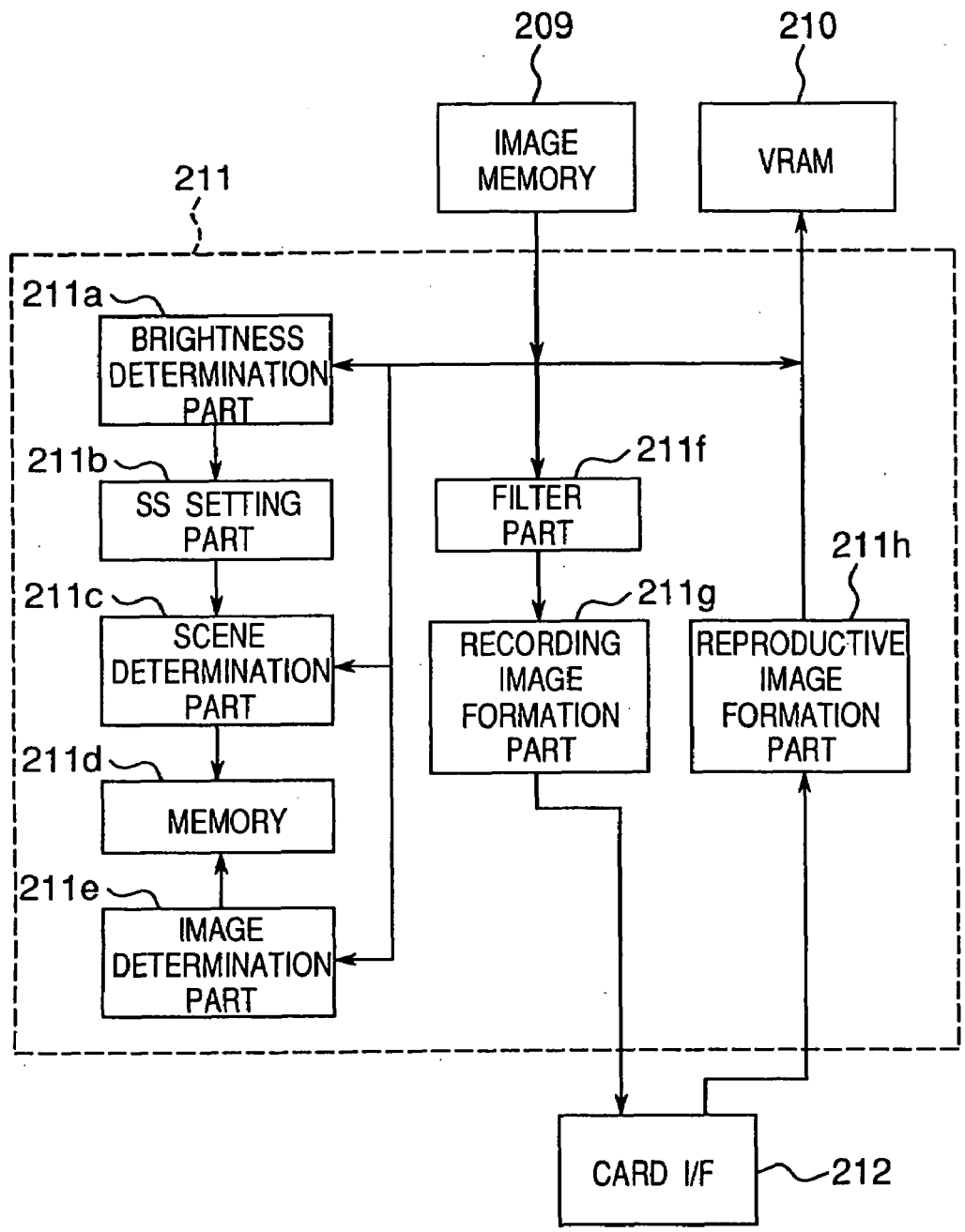
FIG. 6 is a detailed block diagram, showing a main part including a general controller, of the block diagram shown in FIG. 5.

Next, with reference to a block diagram of FIG. 6, it is explained below about the constitution of the general controller 211.

The general controller 211 includes a brightness determination part 211a for setting a value for exposure control (or for setting a value for shutter speed (SS)), and a shutter speed setting part (SS setting part) 211b.

In the exposure standby state, the brightness determination part 211a determines the brightness of the object by making use of images taken in every ⅓₀ second by the CCD 303. That is, the brightness determination part 211a determines the brightness of the object by using image data stored and updated in the image memory 209.

The shutter speed setting part 211b (i.e. "SS SETTING PART" in the figure) sets a shutter speed (integration time of the CCD 303), based on a result of determination about the brightness of the object by the brightness determination part 211a.

For process of recording the aforementioned photographed images, the general controller 211 includes a filter part 211f for performing a filtering process, and includes a recording image formation part 211g for forming a thumbnail image and a compressed image. Also for reproducing an image recorded on the memory card 8 onto the LCD display 10, the general controller 211 further includes a reproductive image formation part 211h for forming its reproduced image.

The filter part 211f compensates a high-frequency component of the image to be recorded by a digital filter, thereby compensating its quality of image in respect of its profiles.

The recording image formation part 211g reads image data from the image memory 209, thereby generating a thumbnail image and a compressed image to be recorded onto the memory card 8. The recording image formation part 211g scans the image memory 209 in the raster scan direction to read out the image data every eight pixels horizontally and vertically, respectively, then transferring the read image data sequentially to the memory card 8. Thus, the recording image formation part 211g forms and records a thumbnail image onto the memory card 8.

Also, the recording image formation part 211g reads out all the pixel data from the image memory 209, and the recording image formation part 211g brings these image data to a predetermined compression process of the JPEG system such as a two-dimensional DCT conversion or Huffman coding, thereby generating image data as a compressed image. Then, the recording image formation part 211g records this compressed image data in a final image area of the memory card 8.

By the way, in the case of a mode for getting the information upon three-dimensional shape, it is desirable that the JPEG compression is not carried out. Namely, in this case, when the image data passes through the recording image formation part 211g, the image data is processed by a 1/1 compression.

When the photographing operation is instructed by the shutter button 9 as the 3D camera is in the exposure mode, the general controller 211 generates a thumbnail image of the image stored in the image memory 209 after the photographing instructions, and generates a compressed image of the captured image compressed by the JPEG system with a compression ratio set by a compression ratio setting switch 12. Then, the general controller 211 stores these two images (i.e. thumbnail image and compressed image) into the memory card 8, together with tag information as to the photographed image (such as frame number, value of exposure, shutter speed, compression ratio, photographing date, flash ON/OFF data at time of exposure, scene information, image determination result, etc.), or other information.

Figure 7:
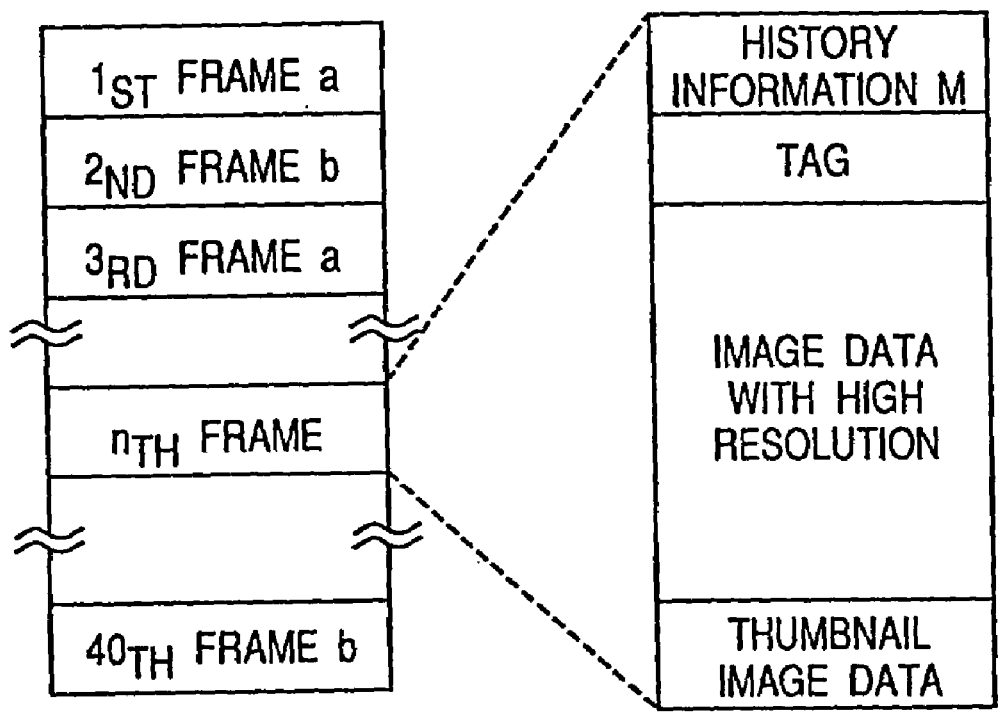
FIG. 7 is an explanatory view showing a mode for getting information upon three-dimensional shape.

In the case of the mode for getting information upon three-dimensional shape, as shown in FIG. 7, both information upon the first frame of the object and information upon the second frame thereof, form information upon the three-dimensional shape of the object. That is, the first frame, denoted by "a", is an image with a stripe pattern, and the second frame, denoted by "b", is a normal image without any stripe pattern. Therefore, if a card is such a card as allowing 40-frame exposures, the card provides 20-scene three-dimensional images.

In each frame including each image recorded by the 3D camera, there are recorded a tag portion, image data with high resolution (1600×1200 pixels) compressed by the JPEG system, and image data (80×60 pixels) for use of thumbnail display.

When the exposure/reproduction mode setting switch 14 is set to the reproduction mode, image data of the largest frame number within the memory card 8 is read out, and the image data is expanded in the reproductive image formation part 211h. Then, the resulting image data is transferred to the "VRAM" 210, by which the image of the largest frame number, i.e., the latest photographed image, is displayed on the display 10.

Operating an "UP" switch Z3 causes an image with a larger frame number to be displayed. On the other hand, operating the "DOWN" switch Z4 causes an image with a smaller frame number to be displayed. However, in the case of taking a photo on the basis of the mode for getting information upon three-dimensional shape of the object, if the information thereupon has been recorded, the images are those corresponding to the information upon the three-dimensional shape of the object. Therefore, the second frame image out of the pair of frame images forming one set, i.e. the "b" image shown in FIG. 7, is outputted. This is intended to prevent any image with the stripe pattern from being displayed on the LCD display 10.

Next, it is explained below about the stripe pattern projecting part 1.

A circuit inside the stripe pattern projecting part 1 is activated when the 3D flash power switch Z5 is ON. With the switch being turned ON, the flash control circuit 216 and the built-in flash device 5 of the camera body are kept inactivated. A controller 514 (see FIG. 5) of the stripe pattern projecting part 1 includes a circuit for activating a flash device 505 of the stripe pattern projector 501, and includes a circuit for switching stripe patterns. In order to switch the mask, a signal is fed to a mask motor M3 so that a mask unit 530 is activated. By the way, an unshown power supply circuit and batteries are installed in the stripe pattern projecting part 1.

Figure 8A:
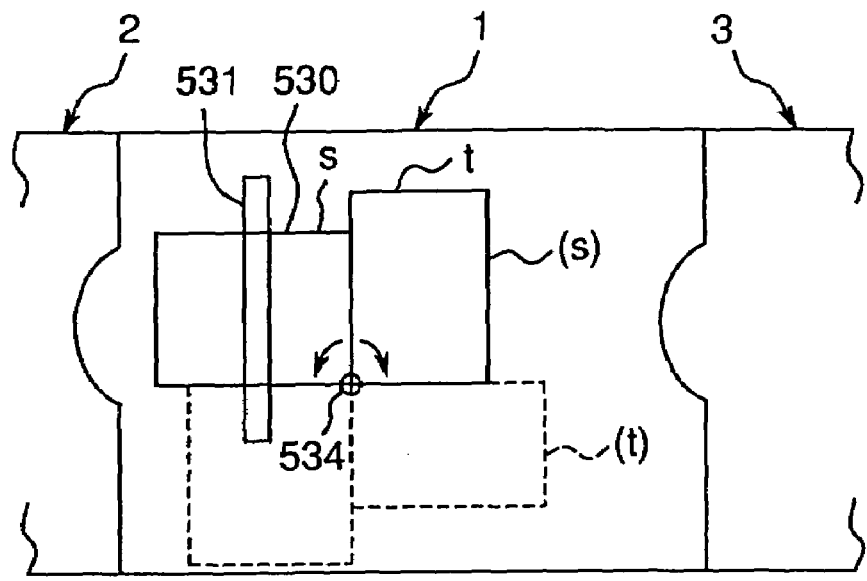
FIG. 8a is a constitutional view, as a front view, of a stripe pattern projecting part of the camera shown in FIG. 1.
Figure 8B:
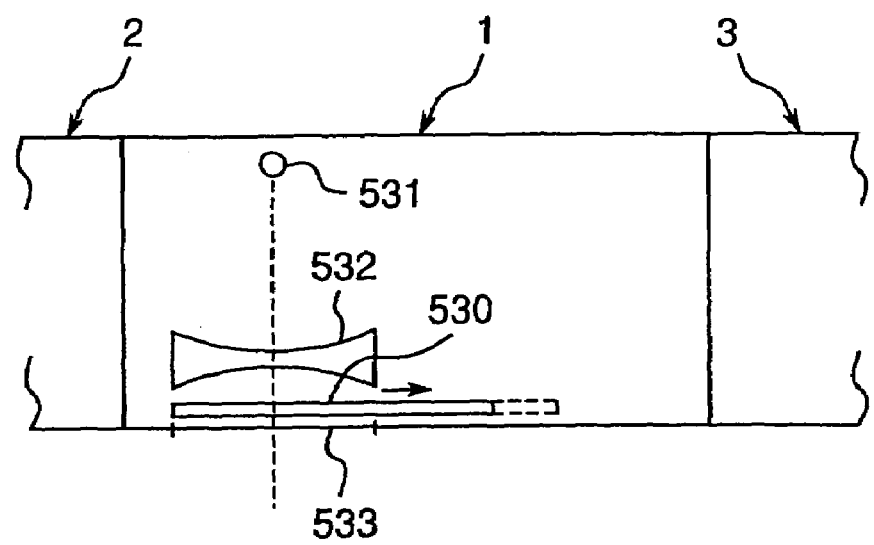

The internal construction of the stripe pattern projecting part 1 is as shown in FIGS. 8a and 8b. FIG. 8a is a front explanatory view, and FIG. 8b is a top explanatory view. Inside the stripe pattern projecting part 1, there are provided a xenon tube 531 for emitting a flash light, a concave lens 532 for widely projecting a stripe pattern towards an object, the mask unit 530 in which two masks are combined together to form a single L-shaped mask part, a shaft 534 for holding the mask unit 530, and an unshown motor for rotating the shaft 534.

When the mask unit 530 is in a position shown by a solid line in FIG. 8a, one mask is projected through a projection window 533. When the mask unit 530 rotates 90 degrees counterclockwise, in the figure, from the solid line position, the other mask is projected through the projection window 533. When the mask unit 530 rotates 90 degrees clockwise, in the figure, from the solid line position, both masks are completely retreated from the projection window 533.

The controller 514 also includes a capacitor for storing electrical energy for the flash light, a switching element IGBT for, upon receiving a signal from the sensor 305, shutting off the flash light emission, and the like. These components are, however, similar in constitution to those installed in the conventional flash circuit; therefore, the explanation thereof is omitted in the specification.

Figure 11A:
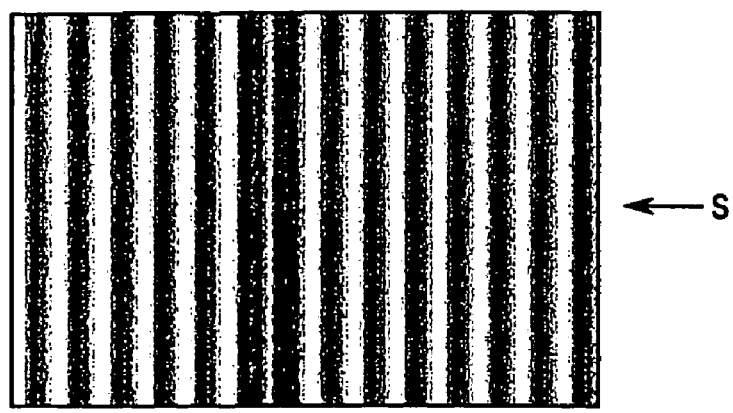
Figure 11B:
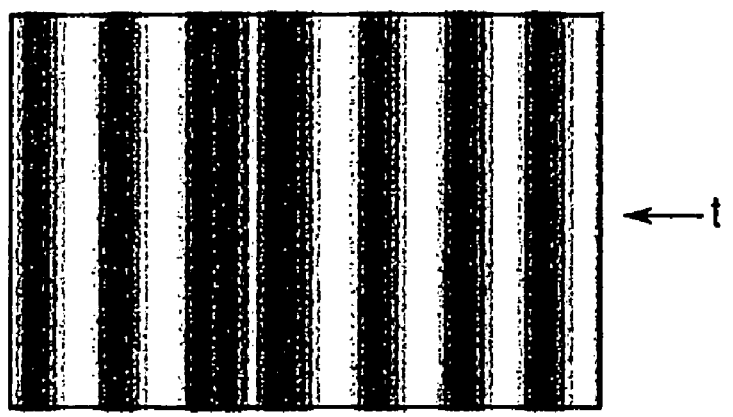
FIG. 11b is an explanatory view showing a stripe pattern, including a plurality of sub-stripes, which corresponds to a mask "s" of a stripe pattern projecting part shown in FIG. 8b.

The pair of masks forming the mask unit 530 have stripe patterns of different frequencies as shown by "s" in FIG. 11a and "t" in FIG. 11b, respectively. The pattern of each mask is in a gradation state.

Figure 12A:
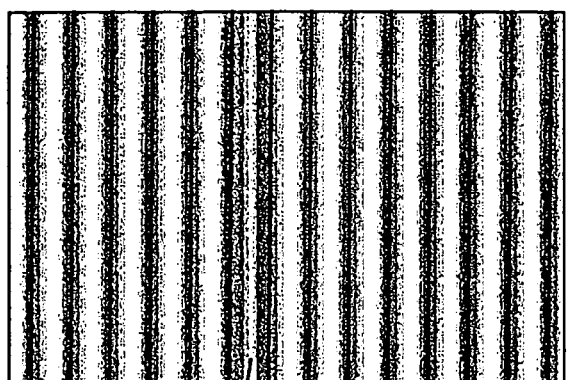
Figure 12B:
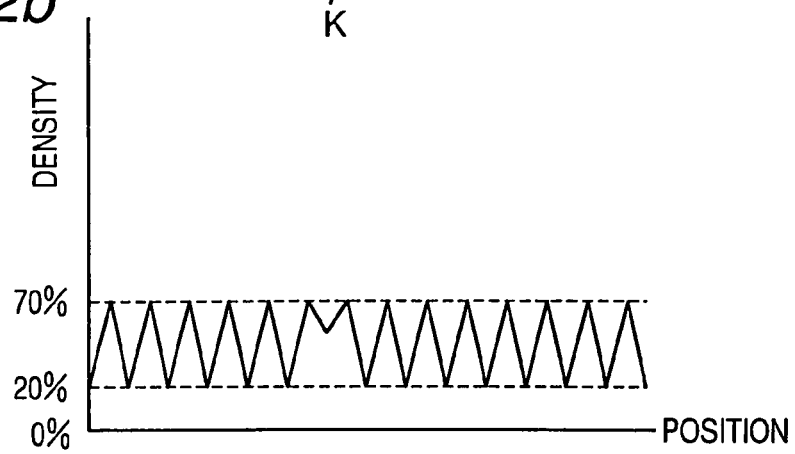

Detailed distribution of the pattern is shown in FIGS. 12a and 12b. One single stripe pattern has, for example, 10 to 30 cycles (i.e. 10 to 30 sub-stripes), and the stripe has a density distribution as shown in FIG. 12b. In the example shown in FIG. 12a, the single stripe pattern has 14 cycles (i.e. 14 sub-stripes). The density thereof is distributed in a region between 20%–70% for example, and the density forms a triangular wave; namely, it is in a state of gradation.

Based upon the density distribution, any phase shift is detected when the projected light after its reflection by the object is sensed or received, and the phase image (i.e. distance distribution image, or three-dimensional image) is gained. In principle, it can be composed of a combination of a monotonous increment part and a monotonous decrement part. Therefore, each thereof can be either a sine wave or a Gaussian distribution. Also, the mask pattern is not limited to gradation. Namely, the mask pattern, alternatively, can be such a pattern as the density varies stepwise.

In FIGS. 12a and 12b, the pattern distribution has a part K at which its color is changed, in order to allow the identification of which component of frequency (or of which ordinal number of sub-stripe) a particular sub-stripe of all the sub-stripes forming the pattern stripe corresponds to. A central part K in FIG. 12a around which the density is changed, is the portion having a color.

Figure 12C:
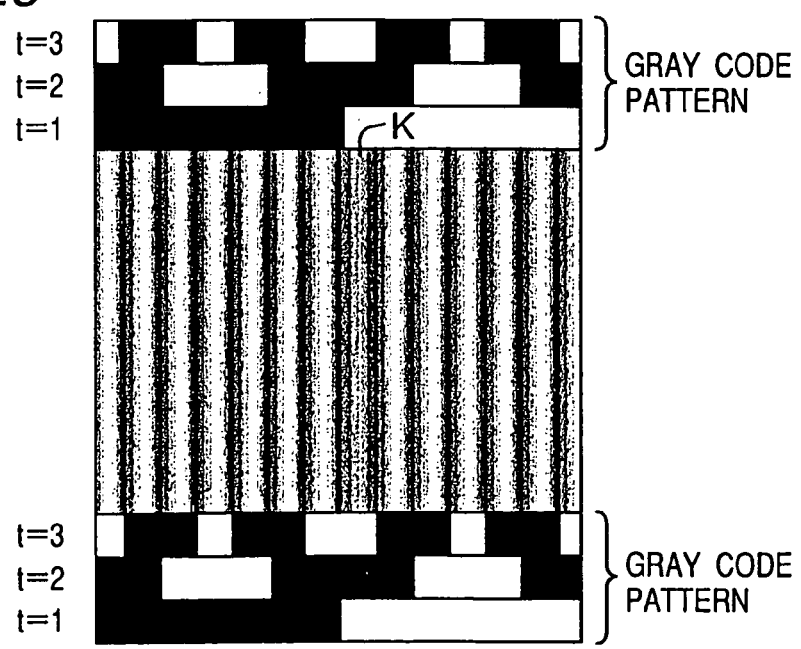
FIG. 12c is an explanatory view of a combination of the stripe pattern shown in FIG. 12a and a gray cord pattern arranged on each side of the stripe pattern.

FIG. 12c shows an arrangement in which the pattern of FIG. 12a is provided centrally with a pair of gray codes being provided on both sides thereof. That is, the gray code pattern can be provided only on an upper part of the central part of the stripe pattern of FIG. 12a, only on a lower part thereof, or on both parts thereof. Each gray code is, for example, composed of sub-codes in three lines (or three-lined sub-codes).

Based upon a combination of the three-lined sub-codes, the location thereof is possible to identify. Further, the precision in positional identification can be enhanced by providing color information and/or by providing the stripe pattern with a variation of density.

Figure 13A:
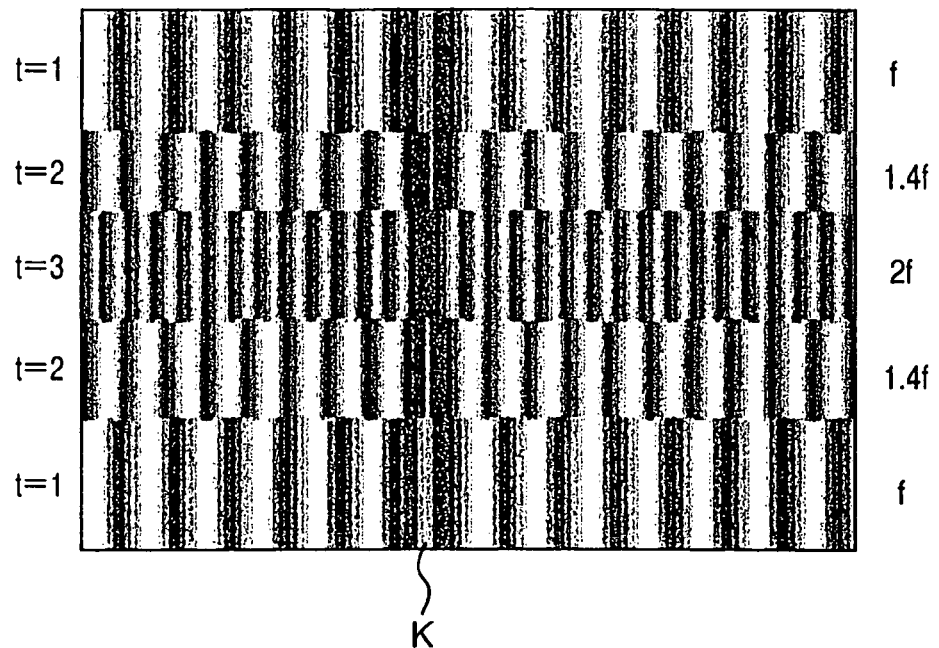
FIG. 13a is an explanatory view showing a stripe pattern according to a modification.
Figure 13B:
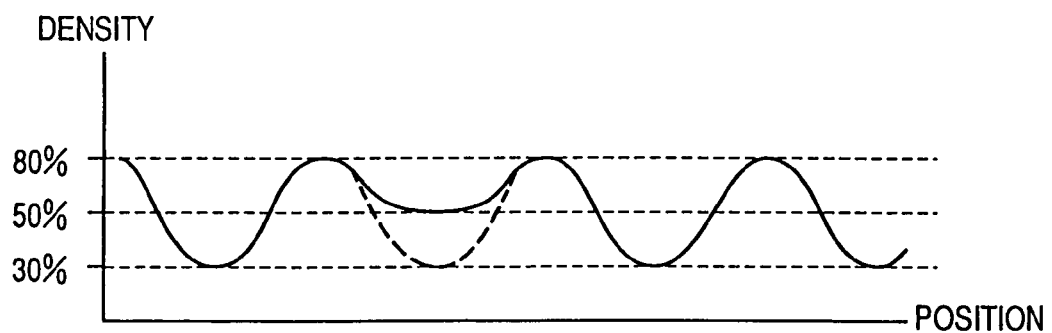
Figure 13C:
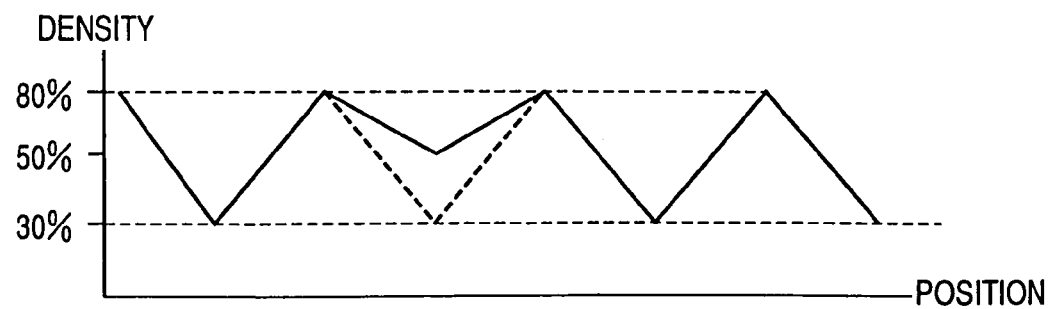
FIG. 13c is a graph showing density of a stripe pattern according to a modification to the stripe pattern shown in FIG. 13b.

FIGS. 13a and 13b show a stripe pattern according to a modification. According to the stripe pattern, low frequencies that allow the position of a particular sub-stripe in the stripe pattern to be easily identified are provided on the peripheral part (i.e. on the upper edge side and on the lower edge side in the figure), and high frequencies are provided in a central part for enhancing the degree of precision thereof. The position of the sub-stripe in the stripe pattern may be identified from the low-frequency pattern, or from both of the low-frequency pattern and the high-frequency pattern.

Those frequencies are set in such a way that, for example, if one frequency is f, the others are 1.4f and 2f. Each sub-stripe in the stripe pattern has a density with a sine-wave (see FIG. 13b) or has a density with a triangular-wave (see FIG. 13c), in which the stripe pattern is in a state of gradation as shown in FIG. 13a.

The stripe pattern is not limited to the state of gradation. Alternatively, the stripe pattern may be in a state in which the density varies stepwise.

Selectively, in order to enhance the degree of precision in positional identification, a colored pattern may be arranged, for example, at a central portion thereof. Namely, not only by making use of a stripe pattern with a gradation, but also by making use of a marker with color information, the degree of precision in positional identification can be enhanced. In this modification, the density ranges from 30% to 80%, in which the density of the colored portion is 50%. The overall density distribution requires a contrast of about 50%. If the CCD sensor is capable of detecting a change of 5% in SN as its detection ability, then it is possible to distinguish ten steps of densities from each other. The larger the contrast is, the higher the resolution becomes. As a result, the degree of gaining precise information upon three-dimensional shape of the object is substantially improved.

In the above arrangement, any pattern having a stripe pattern with a lower frequency is a pattern "t". With the mechanism shown in FIGS. 8a and 8b, it is possible to select one of three ways to project light: a light with a stripe pattern by the mask "s"; a light with a stripe pattern by the mask "t"; and a light without any stripe pattern by employing no mask. Namely, there are some situations in which it is difficult to identify the position of a particular sub-stripe(s) if the spatial frequency of the object is relatively high, or if the spatial frequency of the object is similar to the frequency of the stripe pattern to be projected. Under these situations, any misdetection of the object can be prevented by changing the frequency of the stripe pattern.

The condition for changing the frequency thereof depends upon the basis of the frequency relating to the object. That is, when a photographed image is inputted therein, a check for identifying the frequency is done first. If there are included the same frequency in the image as those of the stripe pattern to a large extent, the image is not put into memory of the 3D camera. Instead, the stripe pattern is first changed, and then the image of the object having the stripe pattern is taken (or photographed) again. With this operation, even if the spatial frequency of the object is similar to that of the stripe pattern, it is possible to gain information upon three-dimensional shape of the object correctly without lowering the precision in identification of the position of the sub-stripes therein.

Next, it is explained below about the mask unit according to a modification.

Figure 14A:
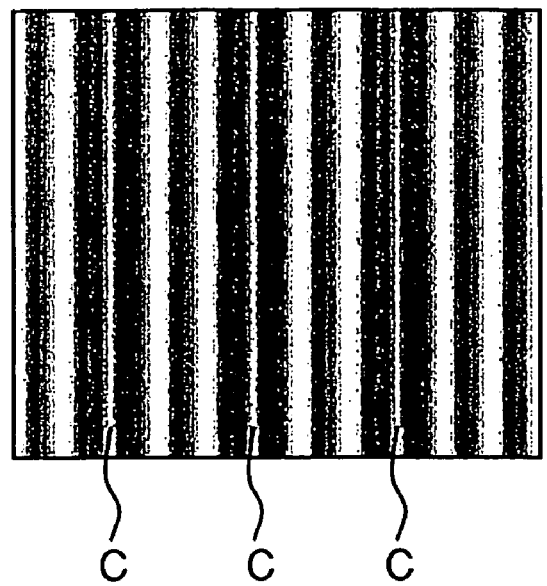
Figure 14B:
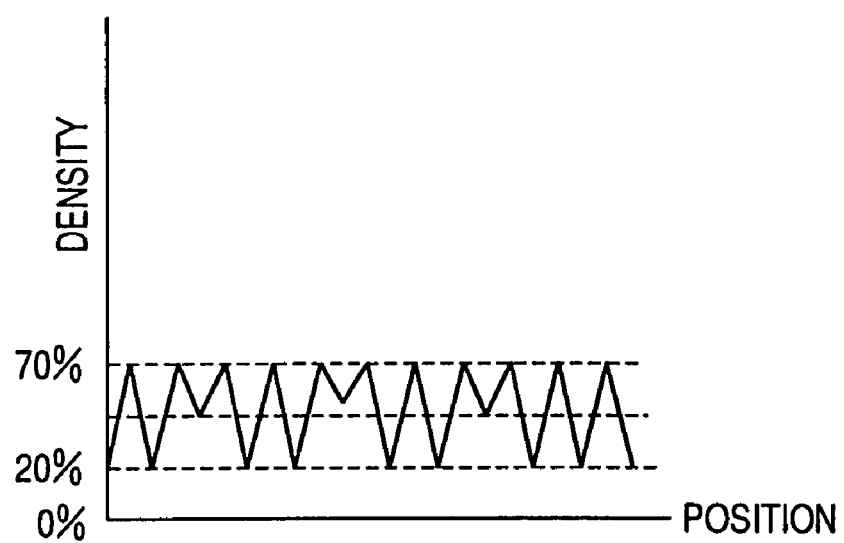
Figure 15A:
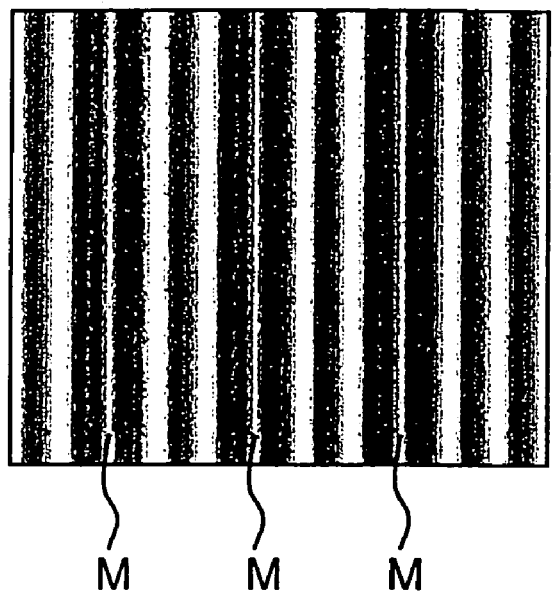
Figure 15B:
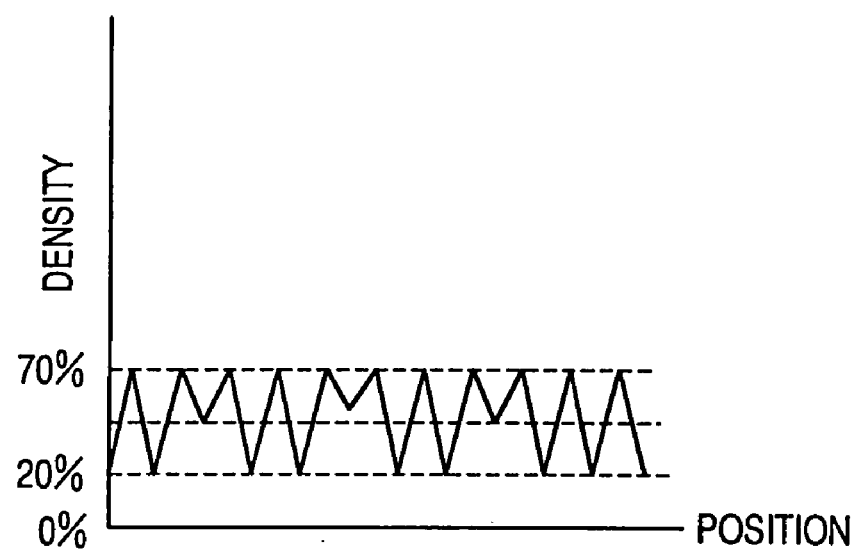

FIGS. 14a and 14b show a stripe pattern (hereinafter, also referred to as an "s" pattern) formed by a mask "S" according to a modification to the mask "s" shown in FIG. 8a; and FIGS. 15a and 15b show a stripe pattern (hereinafter, also referred to as a "t" pattern) formed by a mask "t" according to a modification to the mask "t" shown in FIG. 8a.

FIG. 14a shows the stripe pattern similar to that shown in FIG. 12a. The stripe pattern of FIG. 14a includes a plurality of colored parts, in which the color employed is a single color of cyan (C). The reason why such a single color is employed, is that if such a single color is used, the mask is easier to make or manufacture, which in turn can lower the cost to manufacture the camera. The color of cyan, when projected, allows information with better sensitivity relative to a flesh color (i.e. skin color) to be gained. Therefore, the color of cyan is suitably employed as a color for the marker.

However, if the cyan color is employed, there exists a situation in which it is difficult to specify or identify the position of the object, depending upon the color of the object or upon the color of a light source employed for illuminating the object. In order to solve this problem, the stripe pattern can be changed over, or switched, in order to precisely gain the information upon three-dimensional shape of the object without lowering the precision for identifying the position of the plurality of sub-stripes forming the stripe pattern, even if the color of the object, or the color of the light source with which the object is illuminated, is biased to a certain color. In this case, as shown in the stripe pattern of FIG. 15a, the color of cyan is changed to a color of magenta (M).

The condition for switching between the different colors is based upon the color of an image to be photographed. That is, when an image which has been photographed is inputted, a color check is done first. If it is detected that the color of the image is included in colors of the stripe pattern to a large extent, the image of the object is not stored or memorized. Then, the stripe pattern is changed, and the image of the object with the stripe pattern thus changed is photographed again. With the function to switch over the stripe patterns, even if the color of the object, or the color of the light source, is similar to that of the stripe pattern, it is possible to precisely gain the information upon three-dimensional shape of the object without lowering the precision for identifying a particular position of the sub-stripes forming the stripe pattern.

Figure 16A:
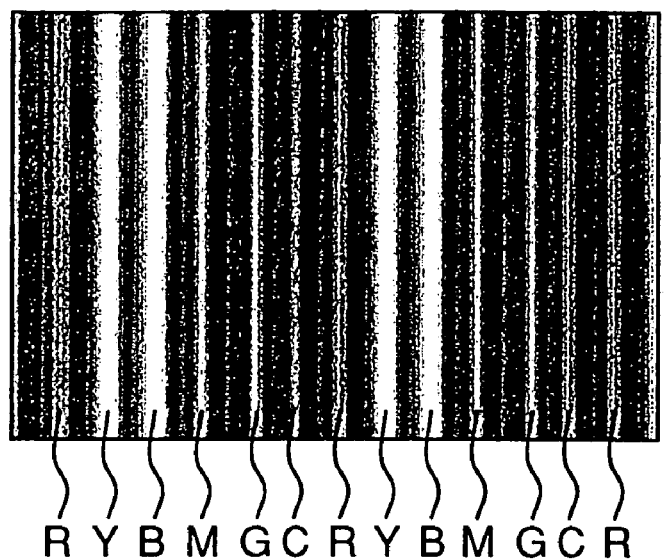
Figure 16B:
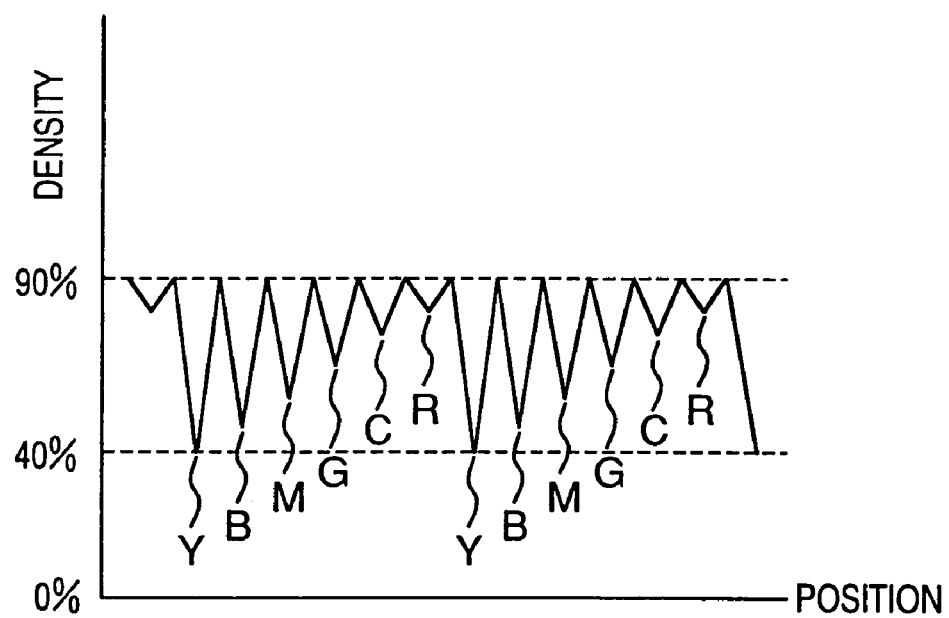
Figure 17A:
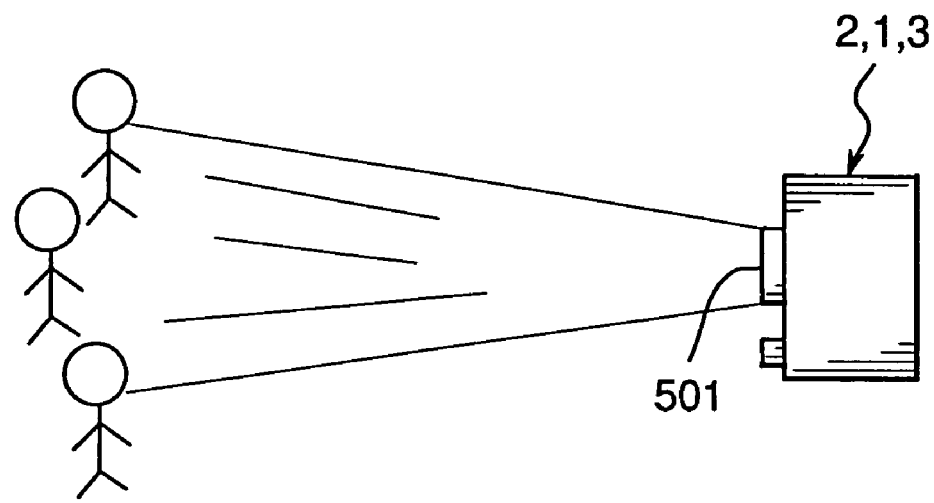
FIG. 17a is an explanatory view showing a projection of the stripe pattern.
Figure 17B:
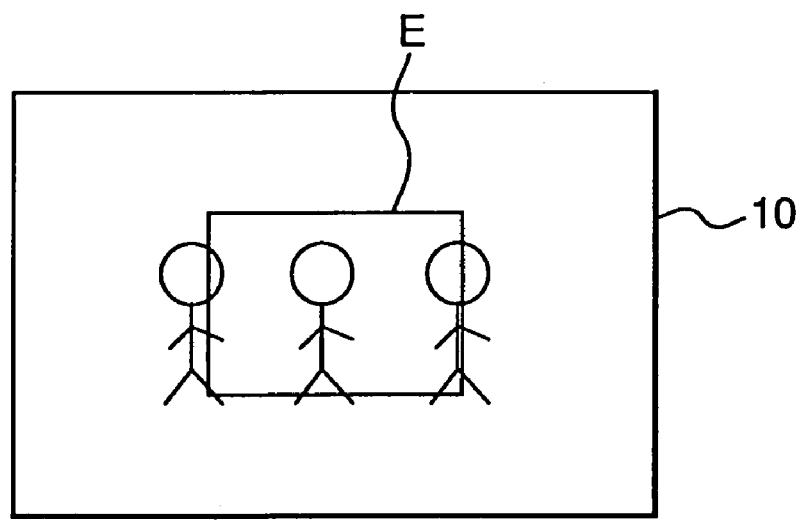
FIG. 17b is an explanatory view showing an image displayed on a monitor of the camera shown in FIG. 1.

As another modification to the "t" pattern, the stripe pattern can be arranged, as shown in FIGS. 16a and 16b. The stripe pattern of this modification includes a plurality of colors of R (red), G (green), B (blue), C (cyan), M (magenta) and Y (yellow), as shown in the figure. If it is possible to prepare and make a colored stripe pattern with a low cost, possibility (or probability) of error in identification of a particular position of the sub-stripes forming the stripe pattern, by employing such a stripe pattern as shown in FIG. 16a.

Next, with reference to FIGS. 9a and 9b, it is explained below about a stripe pattern projecting part according to a modification to the embodiment.

That is, according to the modification, the switchover between an operation to take an image of the object while the stripe pattern is projected onto the object, and an operation to take an image of the object while the stripe pattern is not projected thereon, is executed electrically and not mechanically.

The purpose of this arrangement is to enhance the precision in gain of the information upon three-dimensional shape of the object. Namely, with the arrangement, interval of time between the operation to take the image of the object while the stripe pattern is projected onto the object, and the operation to take the image of the object while the stripe pattern is not projected thereon, is shorten. Therefore, any careless (or unexpected) shift or movement of the image caused by its manual operation of the camera, or any shift or movement of the image caused by the movement of the object itself, is substantially diminished, thus possible to enhance the precision in gain of the information thereupon.

When an image of the object is taken with and without the stripe pattern being projected onto the object, if the camera is not kept in the same positional relationship with the object, it is difficult to gain a phase image of the object. If the stripe pattern is changed over by a mask which employs a space modulation element that is electromagnetically changeable, the stripe pattern can be changed in shorter time than the stripe pattern which is changed over mechanically, so that the precision in gain of the information upon three-dimensional shape of the object is enhanced.

Figure 9A:
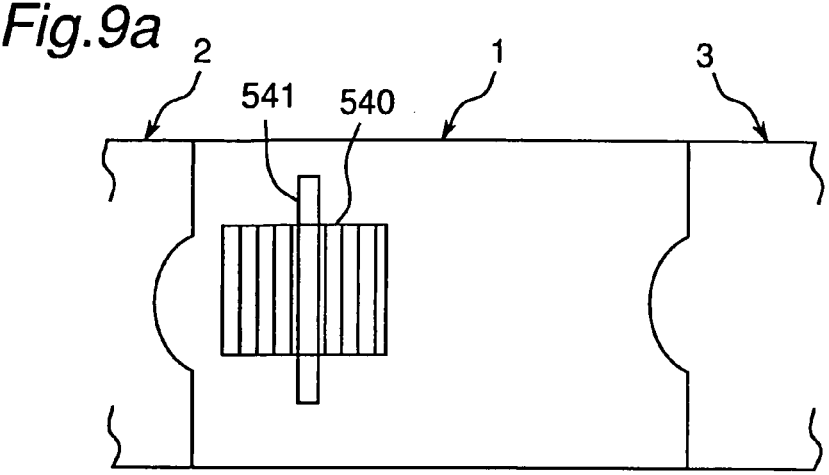
Figure 9B:
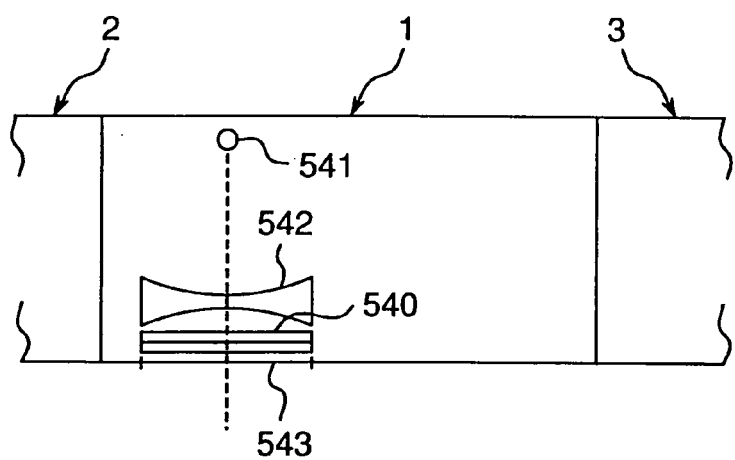

More specifically, as such a stripe pattern projecting part according to the modification, the stripe pattern projecting part employing a liquid crystal element is shown in FIGS. 9a and 9b. That is, FIG. 9a is a front explanatory view of the stripe pattern projecting part 1, and FIG. 9b is a top explanatory view, which shows a xenon tube 541, a liquid crystal panel (LCD) 540, a lens 542 for projecting the stripe pattern on the object, and a pattern projection window 543.

According to this arrangement, there is no need of the mask motor M3 as shown in the circuit of FIG. 5.

A liquid crystal itself employed for the LCD 540 can be of a monochrome type (for example, a white and black type), if the stripe pattern to be projected is of a type as shown in FIGS. 11a, 11b, 12a, 12b, 12c and 13a; on the other hand, the liquid crystal itself employed therefor can be of a polychrome type, if the stripe pattern to be projected is of a type as shown in FIGS. 14a, 14b, 15a and 16a. Although there are various types of liquid crystals, including a type which employs a polarizer, a type which does not employ a polarizer like a guest-host type, a type of organic liquid crystal, etc., it is possible to employ any one of these types for the LCD 540.

The LCD 540 employed in this modification, unlike a common LCD in which a display and a non-display are simply changed over in a bi-level, is capable of a halftone display, thereby allowing sub-patterns in gradation to be provided. Namely, with the arrangement, the precision in gain of the information upon three-dimensional shape of the object is higher than the precision which is realized with the common LCD that is capable of bi-level display only.

Figure 9C:
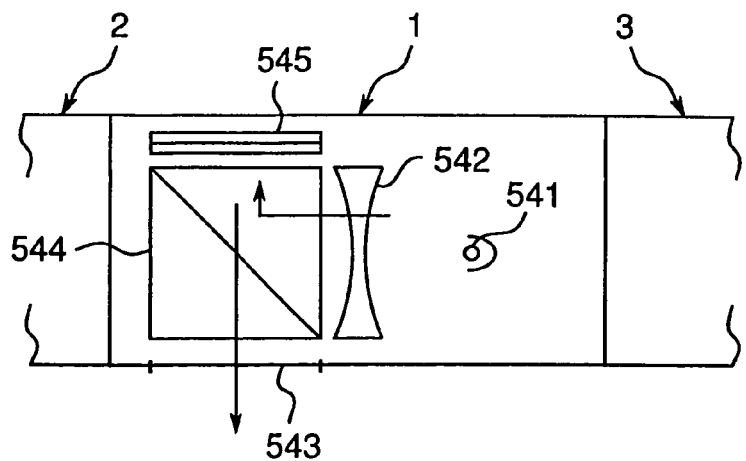
FIG. 9c is a constitutional view, as a top view, of a stripe pattern projecting part according to another modification to the stripe pattern projecting part shown in FIG. 9b.

Further, as another modification to the stripe pattern projection part as shown in FIGS. 9*a* and 9*b*, a stripe pattern can be projected by a light reflected by a liquid crystal panel 545 as shown in a top explanatory view of FIG. 9*c*, instead of projecting the stripe pattern by allowing the light to pass through the liquid crystal panel 540 as shown in FIGS. 9*a* and 9*b*. That is, a light emitted from the xenon tube 541 is illuminated, or radiated, towards the liquid crystal panel 545 through a cross prism 544, and the resulting reflected light is projected through the pattern projection window 543, as shown in the figure.

Further, as another modification, instead of employing the liquid crystal, a transparent type of electrochromic element, or electroluminescence element, may be used, in which a flash light is projected from behind the element so that a stripe pattern and a colored marker with the light passing through the electrochromic element, or electroluminescence element, are given to the object.

Next, with reference to FIGS. 10*a* through 10*d*, it is explained below about a stripe pattern projecting part employing a plurality of light emitting diodes (i.e. LED), instead of employing the flash light source, according to another modification to the embodiment.

The purpose of this arrangement is also to enhance the precision in gain of the information upon three-dimensional shape of the object. Namely, with the arrangement, interval of time between the operation to take the image of the object while the stripe pattern is projected onto the object, and the operation to take the image of the object while the stripe pattern is not projected thereon, is shorten. Therefore, any careless (or unexpected) shift or movement of the image caused by its manual operation of the camera, or any shift or movement of the image caused by the movement of the object itself, is substantially diminished, thus possible to enhance the precision in gain of the information thereupon.

Switchover between the stripe patterns by emission and non-emission of the light emitting diodes, can be speedier than the aforementioned mechanical switchover (refer to FIGS. 8*a* and 8*b*). According to this modification, without employing any flash light source, the information upon three-dimensional shape of the object is gained from an image with the stripe pattern which is formed by the light emitting diodes and from an image without the stripe pattern which is formed by an available light.

Figure 10A:
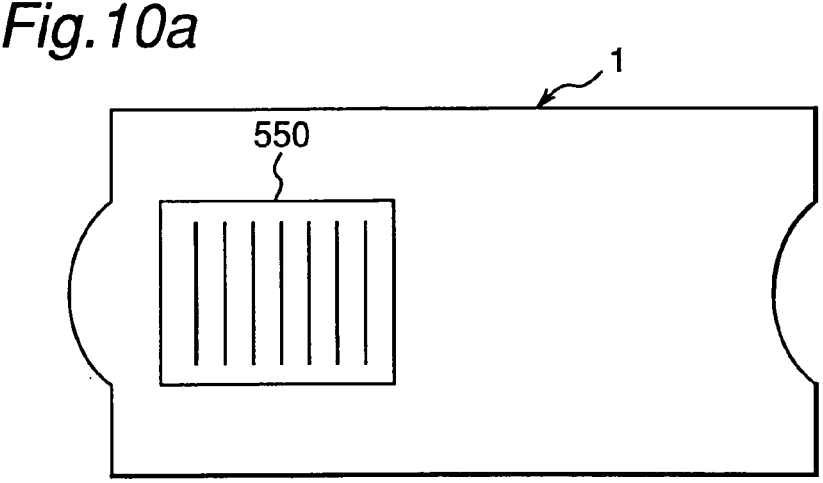
Figure 10B:
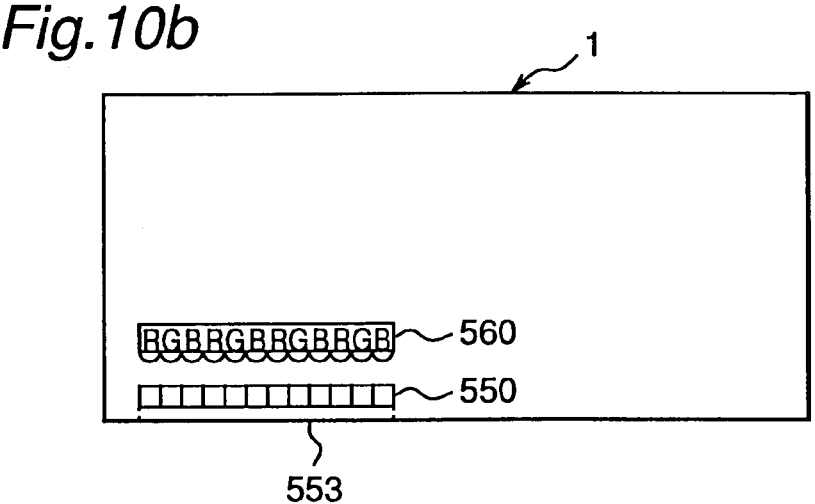

That is, FIG. 10*a* is a front explanatory view of the stripe pattern projecting part 1, and FIG. 10*b* is a top explanatory view thereof. In an array 560 of the light emitting diodes, a diode (or light emitting element) of R (red), a diode (or light emitting element) of G (green), and a diode (or light emitting element) of B (blue) are arranged alternately in a row as shown in FIG. 10*b*, and in which a micro-lens is mounted on each element of the light emitting diodes, respectively, as shown in FIG. 10*b*.

In order to synchronize with a periodic of the light emitting diodes in the row, a mask 550 for forming a specific stripe pattern is positioned in front of the array 560 of the light emitting diodes.

The mask 550 can be of a light-passing monochrome (white and black) type having an arrangement as shown in FIGS. 12*a* and 12*c*, in which a part K where its stripe density changes may be omitted. Light from the respective light emitting diodes included in the array 560 is passed through the mask 550, and is projected through a pattern projection window 553, as shown in FIG. 10*b*. As a result, the light with the stripe pattern in which R (red), G (green) and B (blue) are alternately repeated, is projected towards the object.

Figure 10C:
FIG. 10c is a constitutional view showing an array of light emitting diodes according to a modification to the array of light emitting diodes shown in FIG. 10b.

Alternatively, as another modification, the array 560 can include a plurality of light emitting diodes of W (white), R (red), W (white), G (green), W (white), B (blue) and W (white), as shown in FIG. 10*c*. According to this arrangement, a light emitting element of W(white) is included in the array; therefore, the color compensation becomes easier.

According to the arrangement shown in FIGS. 10*a*, 10*b* and 10*c*, only a pattern light with the stripe pattern is projected through the pattern projection window 553 installed on the stripe pattern projecting part 1. Therefore, in order to gain an image without any stripe pattern, it is necessary to take the image of the object with an available light without employing any auxiliary light such as a flash light, or with a flash light which is emitted by the flash device 5 of the camera body 2.

Alternatively, as another modification, it is also possible to project the pattern light directly from the array 560 of the light emitting diodes to the object, without the mask 550 intervening between the array 560 and the object.

Figure 10D:
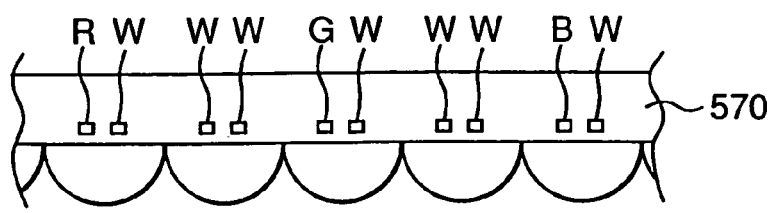
FIG. 10d is a constitutional view showing an array of light emitting diodes according to another modification to the array of light emitting diodes shown in FIG. 10b.

In this arrangement, as shown in FIG. 10*d*, a pair of light emitting elements (or diodes) are arranged as one set relative to each micro-lens, in which the array 570 of the light emitting diodes is possible to change in color.

According to this arrangement, an image with the stripe pattern is taken when a pattern light with the stripe pattern is projected onto the object by emitting one (i.e. R, W, G, W, B which are positioned on the left side per each set in the figure) of the pair of light emitting diodes per set; on the other hand, an image without the stripe pattern is taken when a flat light whitish in color without the stripe pattern is projected onto the object by emitting the other (i.e. W, W, W, W, W which are positioned on the right side per each set in the figure) of the pair of light emitting diodes per set.

Next, with reference to FIGS. 19 and 20, an operation of the camera is explained below.

First, after the main switch PS of the camera is turned ON, the 3D flash switch Z5 is turned ON at step #U1, and then the 3D mode is set at step #U2. In order to set the mode, the switch keys 521–526 are employed.

Alternatively, as a modification, the operation to set the mode may be executed as an automatic setting operation which is executed simultaneously when the 3D flash switch Z5 is turned ON.

Alternatively, as a modification, if its electric circuit and its power source are provided inside the camera body only, the operation to set the mode may be carried out with the switch keys 521–526 only.

Once the operation to set the mode is accomplished, an input area, or input region, for information upon three-dimensional shape of the object is displayed on the LCD monitor 10 at step #U3, and a "BUSY" is displayed (i.e. LED2 is lit on) at step #U4, and then the stripe pattern "t" is set at step #U5. A live image of the object is displayed on the LCD display 10 at step #U6. Then, an operation to charge electricity to a capacitor (not shown) for the flash device starts to be executed at step #U7. After the operation to charge electricity thereto is finished at steps #U8 and

U10, the display of "BUSY" is ended at step #U9. Then, at step #U11, a start signal of the shutter (i.e. shutter button 9 being turned ON) is awaited.

In order to take the image of the object, a pair of continuous (or successive) exposures of the object are necessitated (i.e. the subject has to be photographed twice successively). One image to be taken is the image with a stripe pattern, and the other image to be taken is the image without the stripe pattern. Upon the input of the start signal, the operation to take the first image of the object is started, and the integration for the image-taking sensor is started at step #U12. During the integration, the flash light with the stripe pattern is emitted, by which operation the image with the stripe pattern is gained at step #U13.

According to the embodiment, although the image with the stripe pattern comes first as the first image of the object at step #U13, the image with the stripe pattern may come last as the second image, as a modification to the embodiment.

Before the image which has been inputted is stored or memorized, an operation to check the frequency of the image of the object is performed at steps #U14 and #U15.

Figure 20:
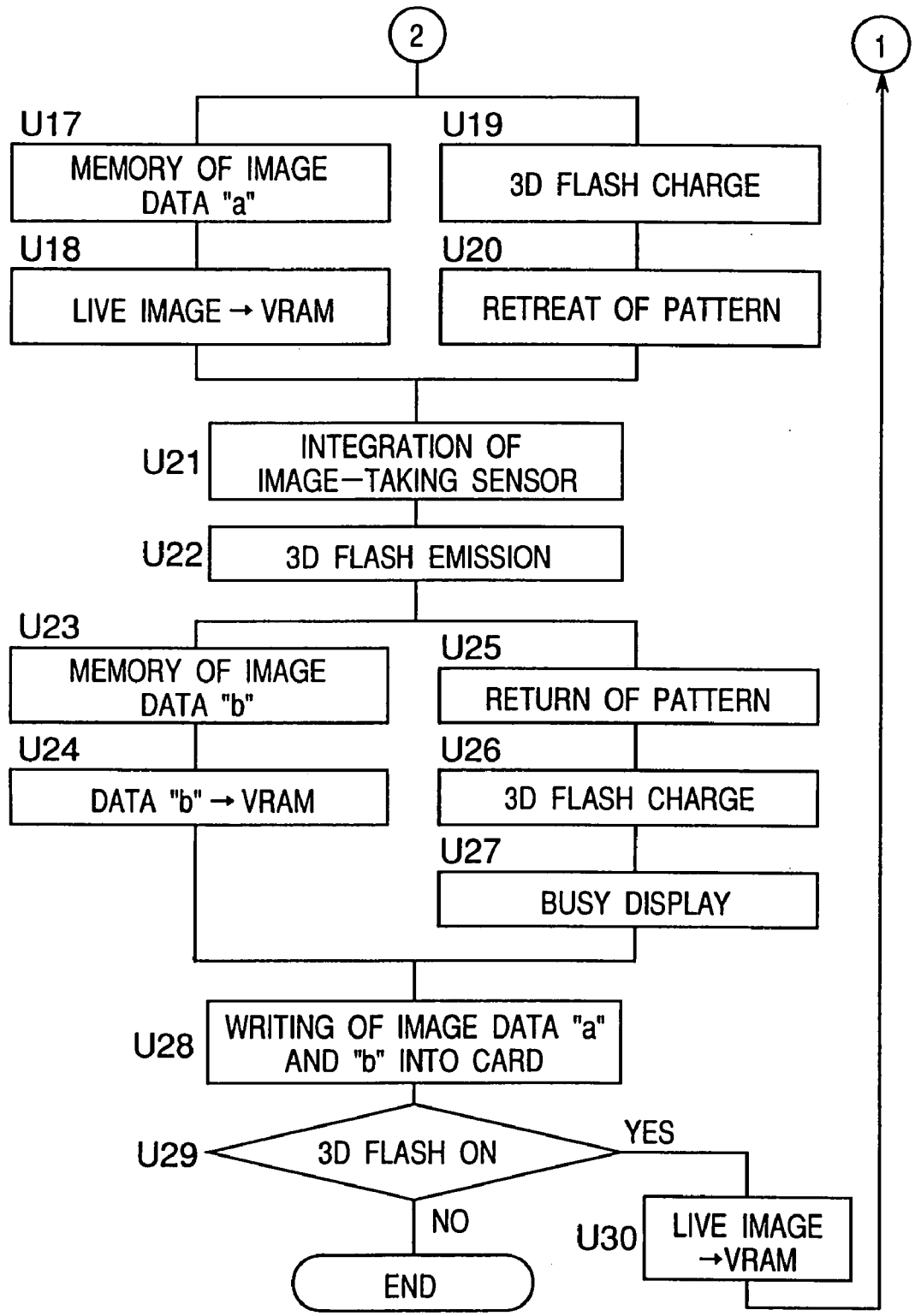
FIG. 20 is a flowchart which is subsequent to FIG. 19.

If it is determined at steps #U14 and #U15 that the frequency thereof is different from that of the stripe pattern and that it is possible to gain the information upon three-dimensional shape of the object, the program proceeds to steps #U17 and #U19 (see FIG. 20).

On the other hand, if it is determined at steps #U14 and #U15 that it is not possible to gain the information upon three-dimensional shape, the stripe pattern is switched from the "t" pattern to the "s" pattern at step #U16. Then, the program returns to step #U12 for taking the image of the object once again with the "s" pattern.

The change of frequency is not limited to the mechanical change. Alternatively, as a modification, it is also possible to change the frequency by changing the LCD pattern.

Figure 19:
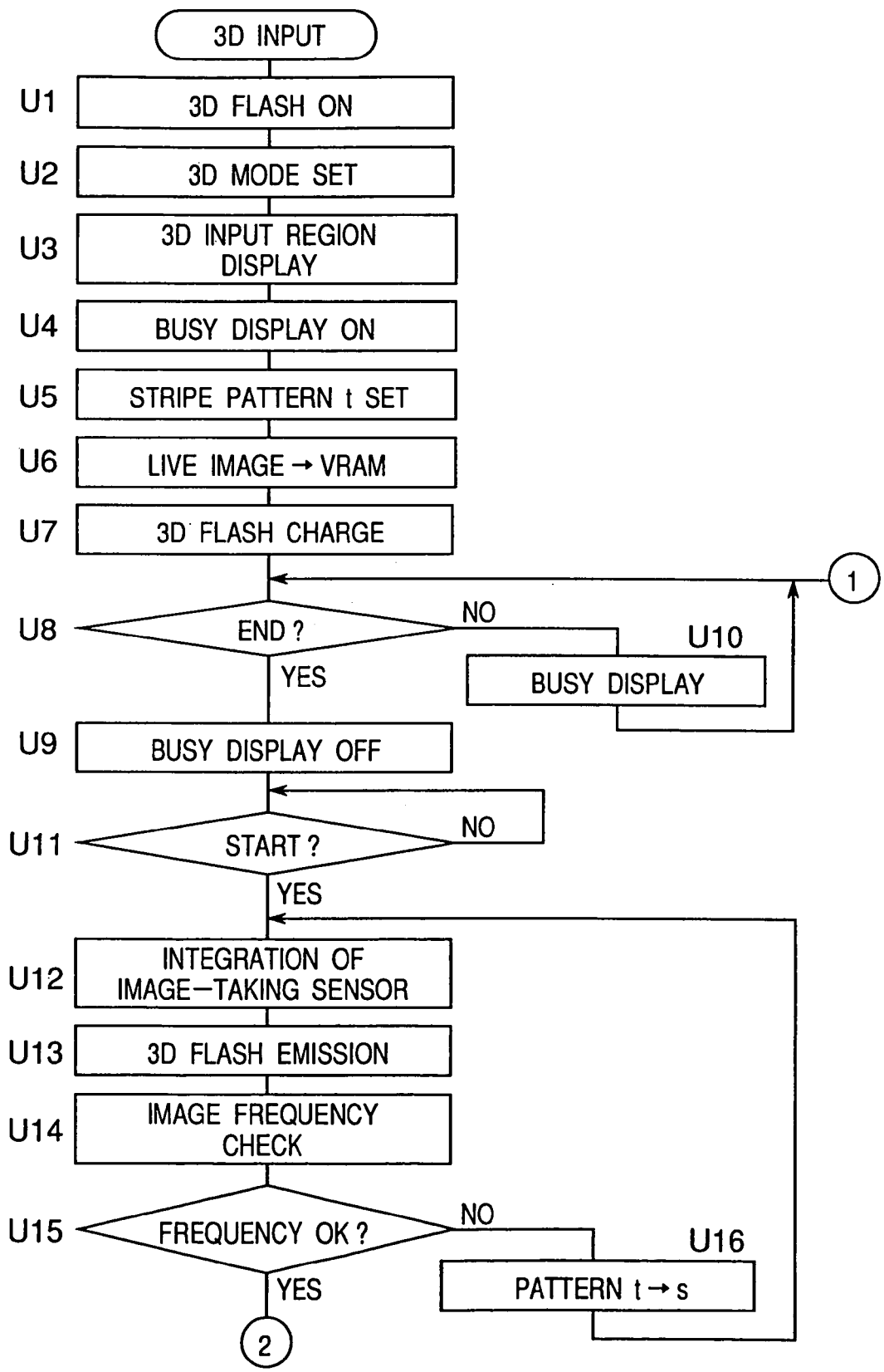
FIG. 19 is a flowchart showing an operation of the camera shown in FIG. 1.
Figure 21:
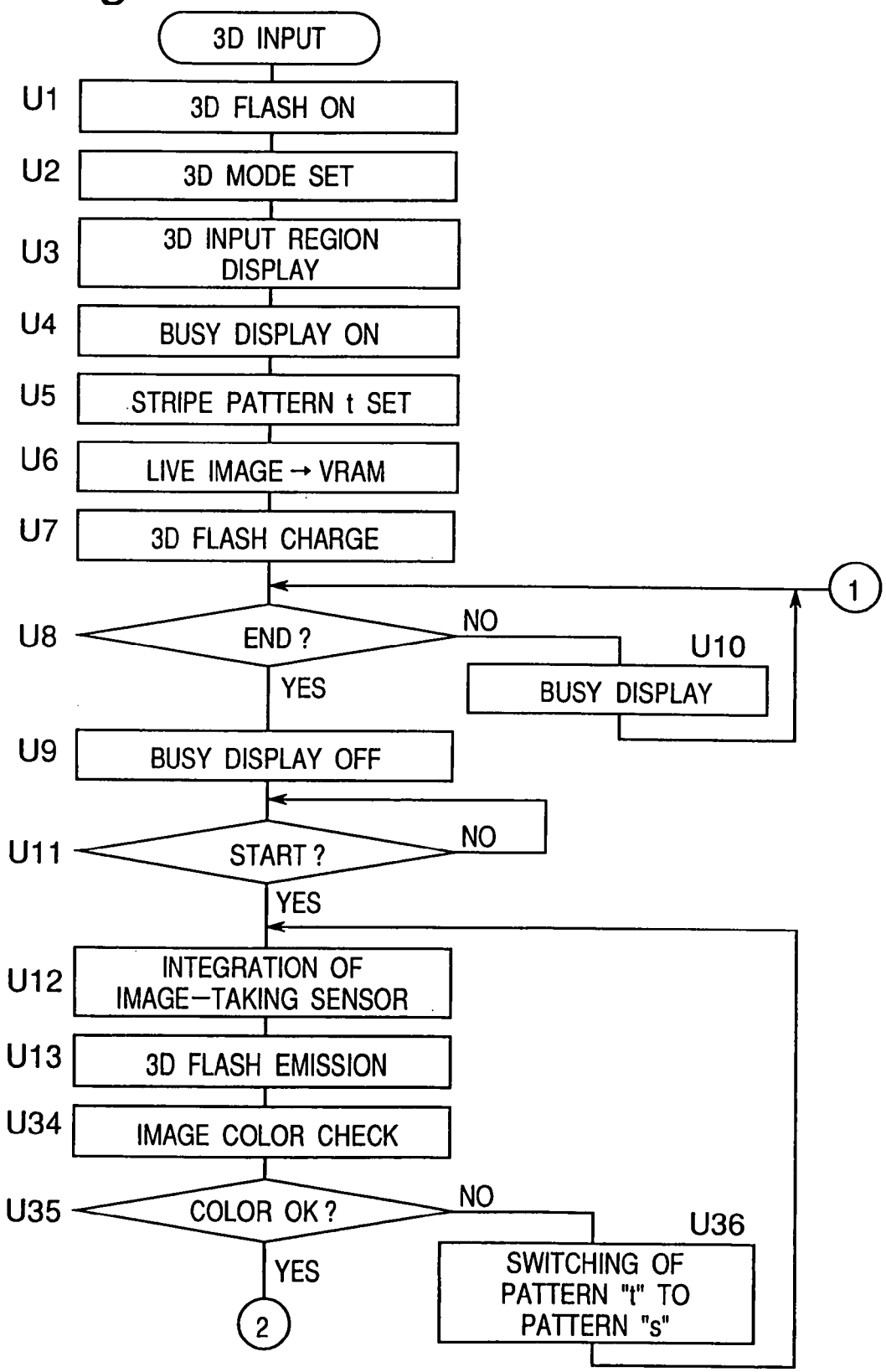
FIG. 21 is a flowchart showing an operation according to a modification to the operation shown in FIG. 19.

Alternatively, instead of checking the frequency of the image as shown at step #U14 in FIG. 19, it is also possible to check the color of the image, as a modification, as shown in FIG. 21.

That is, according to the modification, whether it is possible to gain the information upon three-dimensional shape or not is determined on the basis of the color of the object, or on the basis of the color due to the light emitted from the light source. This operation to check the color is done by making use of the function of automatic white balance (AWB) for images at step #U34.

Then, if it is determined at step #U35 that the marker is correctly identified, or confirmed, by the color and that a phase image which identifies the position of the the stripe pattern is gained (namely, if it is determined at step #U35 that it is possible to gain the information upon three-dimensional shape of the object), then the program proceeds to steps #U17 and #U19 (see FIG. 20).

If, however, it is determined at step #U35 that it is not possible to gain the information upon three-dimensional shape, the program proceeds to step #U36 at which the stripe pattern is changed from the "t" pattern to the "s" pattern, and the program returns to step #U12 at which an operation to take the image is executed once again without storing the image which has been thus taken once.

By the way, it is to be noted that the patterns "s" and "t" which are referred to in FIG. 21, correspond to the patterns which are shown in FIGS. 14 and 15, respectively.

Anyway, if it is determined that the "FREQUENCY" is "OK" at step #U15 in FIG. 19, or that the "COLOR" is "OK" at step #U35 in FIG. 21, the program proceeds to steps #U17 and #U19, as shown in FIG. 20.

That is, as shown in the figure, image data "a" which is the image having the stripe pattern, is memorized at step #U17, in the camera body 2. At this time, the image which has been photographed is the image having the stripe pattern. However, the LCD display 10 displays the image without the stripe pattern at step #U18, which has been stored or memorized on VRAM before the image having the stripe pattern is taken.

Meanwhile, unlike a general operation to emit a flash light from a flash device of the conventional camera, any electric re-charging operation after the flashing operation executed at step #U19 is prohibited on a side of the stripe pattern projecting part 1, and the stripe pattern is retreated at step #U20. By the way, the reason why the electric re-charging is inhibited after the flashing operation is explained later.

The mask is retreated by the mask motor M3, as shown in FIG. 8a. The time to retreat the mask is made short, so as to make as short as possible the interval of time between the times when the image of the object is taken twice successively. The time interval is set to such an interval that even if the object moves, the resulting image shift or movement is negligible. Preferably, the time interval should be, for example, within 100 ms including a bounding movement of the mask.

Well, the reason why the electric re-charging is inhibited after the flashing operation is as follows.

That is, if the retreat of the mask is carried out by the mask motor, the mask motor consumes a great amount of electric current. Therefore, if the operation to charge the electricity to the capacitor for the flash device is started simultaneously at the time when the mask motor is electrically actuated, much greater amount of electric current is consumed at one time. Namely, under such a situation, there is a possibility that the motor is not driven and that the mask cannot be retreated, which in turn makes it impossible to gain the image without the stripe pattern at the second operation to take the image. Due to this reason, the operation to charge electricity to the capacitor for the flash device is not carried out simultaneously with the actuation of the motor.

After the stripe pattern is changed over, the second operation to take the image of the objcet is started at steps #U21. Similarly, the flash light is emitted from the flash device at step #U22, and the image without the stripe pattern is gained.

Then, the image "b" without the stripe pattern is stored at step #U23. Then, the image without the stripe pattern which thus has been stored, is displayed on the LCD monitor 10 at step #U24.

Meanwhile, in parallel to this operation, the retreated pattern is returned at step #U25, on the side of the stripe pattern projecting part 1. Then, the operation to charge electricity to the capacitor for the flash device is resumed at step #U26. At this time, the "BUSY" display is on again at step #U27.

After the completion of the steps #U24 and #U27, the image "a" with the stripe pattern and the image "b" without the stripe pattern are written into the memory card 8 at step #U28.

The reason why the image "a" with the stripe pattern and the image "b" without the stripe pattern are written into the memory card 8 at the same time is for the purpose of shortening the interval of time between the two successive exposures. Namely, it takes a longer time if the writing in the memory card 8 is done one by one. In other words, the 3D mode (i.e. a mode for getting information upon three-dimensional shape of the object) is the mode in which the image data is written into the memory card 8 on the two-image basis.

Then, the program proceeds to step #U29, at which it is determined if the 3D flash switch Z5 is kept ON, or not. If the 3D flash switch Z5 is kept ON, the display is switched to its live image display mode at which the LCD display 10 displays the image without the stripe pattern, which has been stored or memorized on VRAM before the image having the stripe pattern is taken, as explained above. Then, the program returns to step #U8.

On the other hand, FIG. 21 shows a sequence for changing the stripe pattern on the basis of the color of the image which has been taken, as explained with reference to FIGS. 14 and 15. According to this modification, steps other than steps #U34, #U35 and #U36 are the same as those shown in FIG. 19.

By the way, since the sequence from step #U1 through step #13 shown in FIG. 21 is the same as the sequence shown in FIG. 21, the explanation about the corresponding sequence is omitted below.

Figure 22:
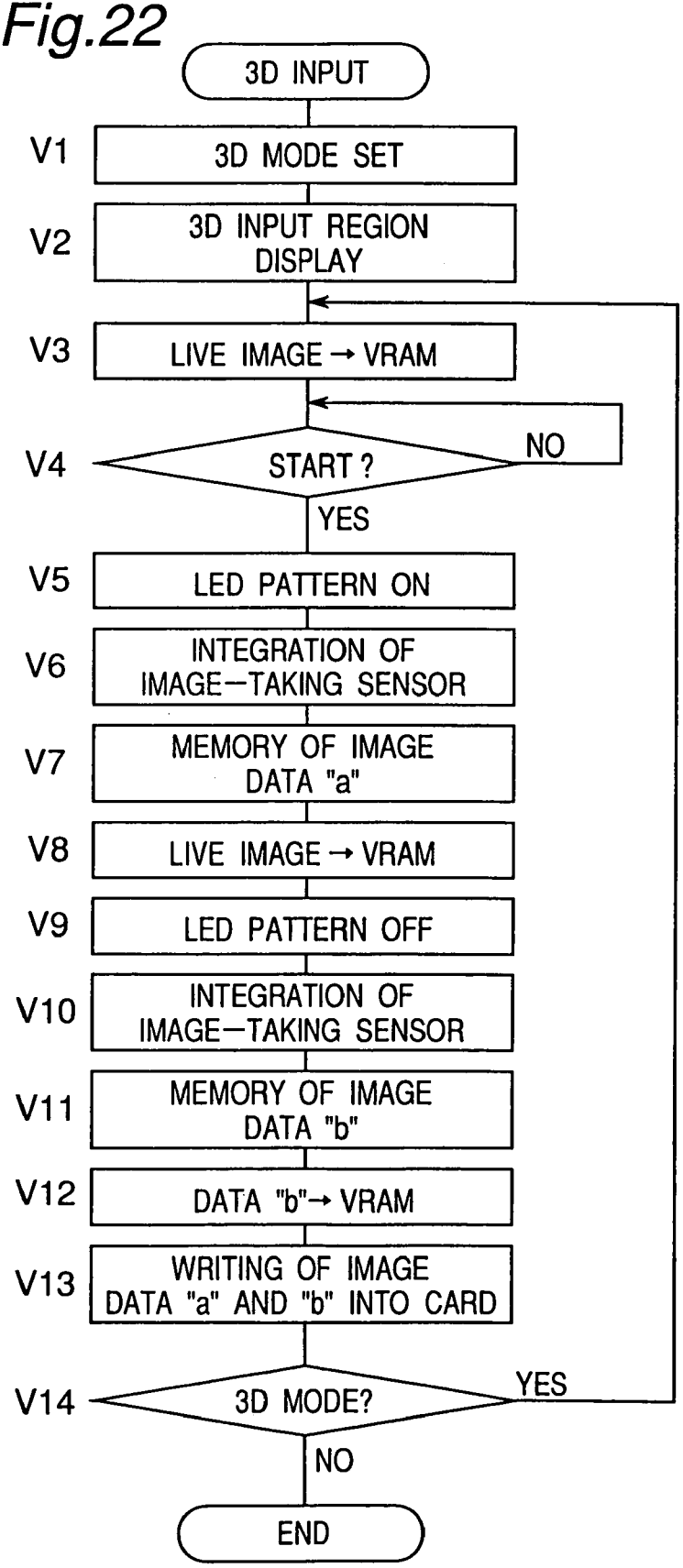
FIG. 22 is a flowchart showing an operation according to a modification, in which the stripe pattern is projected with the light emitting diodes.
Figure 23:
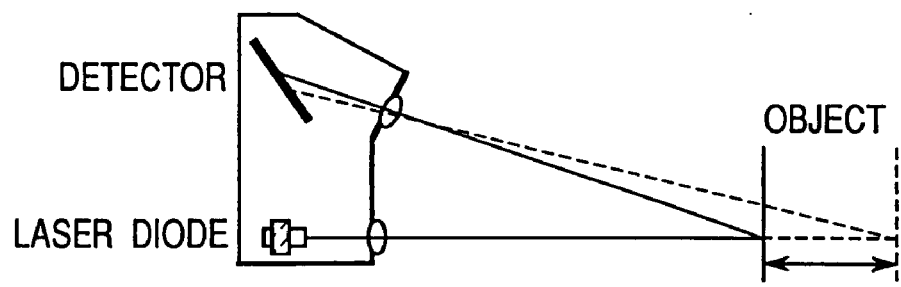
FIG. 23 is an explanatory view of prior art.
Figure 24:
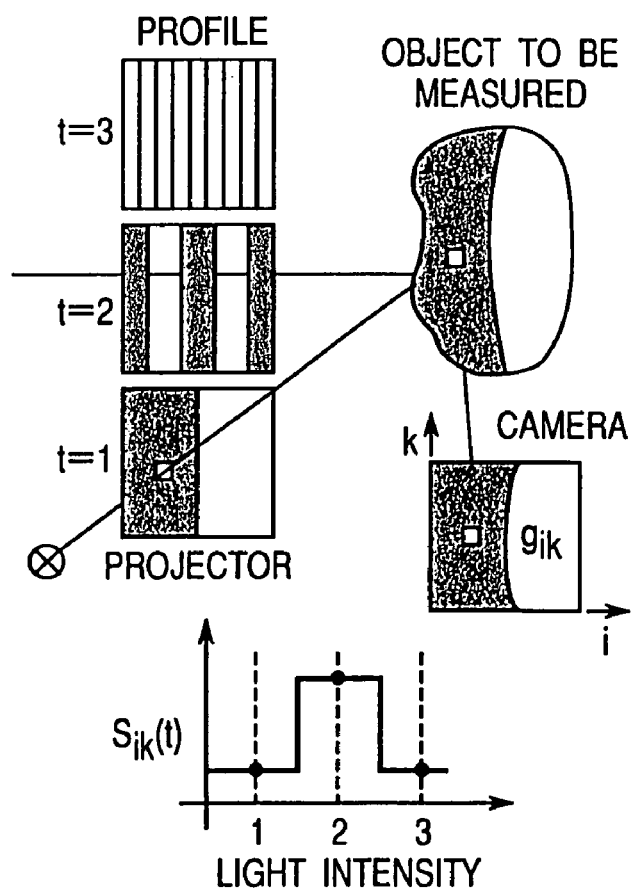
FIG. 24 is an explanatory view of prior art.
Figure 25:
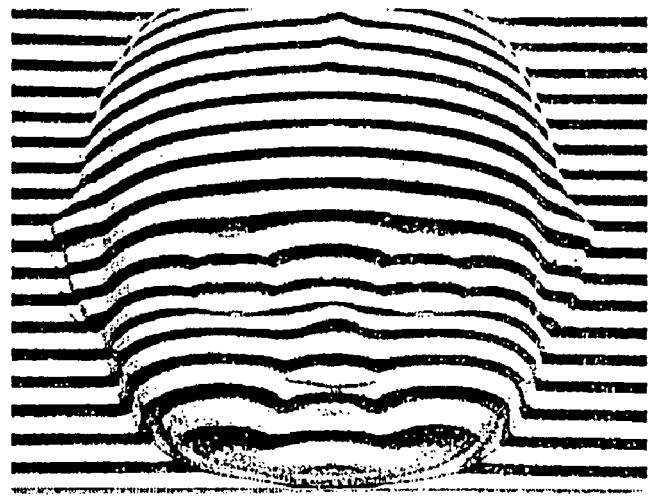
FIG. 25 is an explanatory view of prior art.
Figure 26:
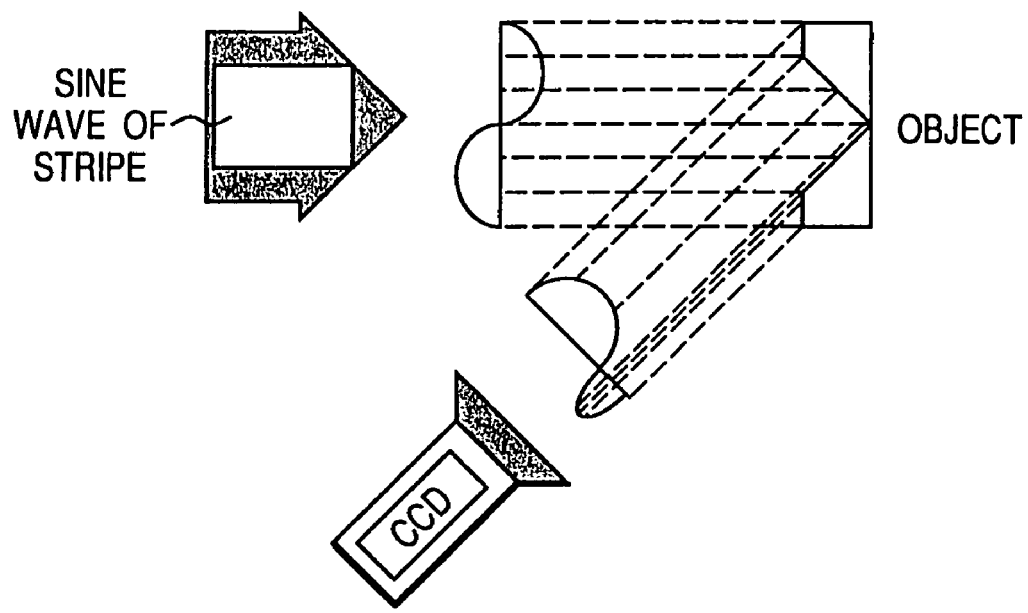
FIG. 26 is an explanatory view of prior art.

Next, with reference to FIGS. 19, 20 and 22, it is explained about a sequence according to a modification, in which an LCD is employed for projecting the stripe pattern.

In this modification, steps #U14, #U15 and #U16 are omitted from the flowchart of FIG. 19, and the operation of "STRIPE PATTERN t SET" at step #U5 is replaced with an operation of "STRIPE PATTERN of LCD IS TURNED ON". Also, at step #U20 in FIG. 20, the operation of "RETREAT OF PATTERN" is replaced with an operation of "STRIPE PATTERN OF LCD IS TURNED OFF". Also, at step #U25, the operation of "RETURN OF PATTERN" is replaced with an operation of "LCD STRIPE PATTERN ON".

In the arrangement, after the main switch PS of the camera is turned ON, the 3D mode (i.e. the mode for gaining information upon three-dimensional shape) is set at step #V1. In this modification, the switch keys 521–526 are used for the mode setting.

Alternatively, as a modification, the setting of the mode can be performed as an automatic setting, simultaneously when the switch Z5 is turned on.

Alternatively, as a modification, if the electric circuit and the power supply are provided on the side of the camera body 2 only, the setting of the mode can be performed by employing the switch keys 521–526 only.

Once the operation to set the mode is accomplished, the area (or region) for gaining the information upon three-dimensional shape of the object is displayed on the LCD monitor 10 at step #V2, and a live image of the object is displayed on the LCD display 10 at step #V3. Then, a start signal (i.e. the shutter button 9 being switched ON) is awaited at step #V4.

Upon the input of the start signal, the stripe pattern is projected by the LEDs at step #V5. And the first operation to take the image of the object is started, and the operation of integration for the image-taking sensor is started at step #V6, by which operation an image with the stripe pattern is gained.

By the way, at step #V6, although the image with the stripe pattern becomes the first image. Alternatively, as a modification, the image with the stripe pattern may become the second image.

Then, the image data "a" (i.e. the image with the stripe pattern) is stored on the side of the camera body 2, at step #V7. At this time, the image which has been taken is the image having the stripe pattern. However, the LCD display 10 displays the image without the stripe pattern at step #V8, which has been stored or memorized on VRAM before the image having the stripe pattern is taken.

Then, with the LED for projecting the stripe pattern being turned OFF at step #V9, integration for the next operation of the image-taking sensor is started at step #V10. Because only the ON-OFF operation of the LED is executed, the interval of time between the two successive exposures relative to the object is shorter. Therefore, even if the object moves, the shift, or movement, of the resulting image is negligible.

By the operation to take the second image, an image without the stripe pattern is gained. In the modification, if the LED is of the type as shown in FIG. 10d, only the LED (or LEDs) emitting the white light is lit to illuminate the object without the pattern, by which operation the image without the stripe pattern is gained.

Then, the image "b" without the stripe pattern is stored at step #V11, and then the result of the image which has been taken (i.e. the image which has been taken of the object without the stripe pattern), is displayed on the LCD monitor 10 at step #V12.

The image "a" with the stripe pattern and the image "b" without the stripe pattern are written into the memory card 8 at the same time, at step #V13. The reason why the image "a" with the stripe pattern and the image "b" without the stripe pattern are written into the memory card 8 at the same time is for the purpose of shortening the interval of time between the two successive exposures. Namely, it takes a longer time if the writing in the memory card 8 is carried out one by one, or step by step. In other words, the 3D mode (i.e. a mode for getting information upon three-dimensional shape of the object) is the mode in which the image data is written into the memory card 8 on the two-image basis.

Then, the program proceeds to step #V14 at which it is determined if the 3D mode is set or not. If it is determined at step #V14 that the 3D mode is set, the program returns to step #V3, and the display is switched to a mode of the live image display.

Figure 18:
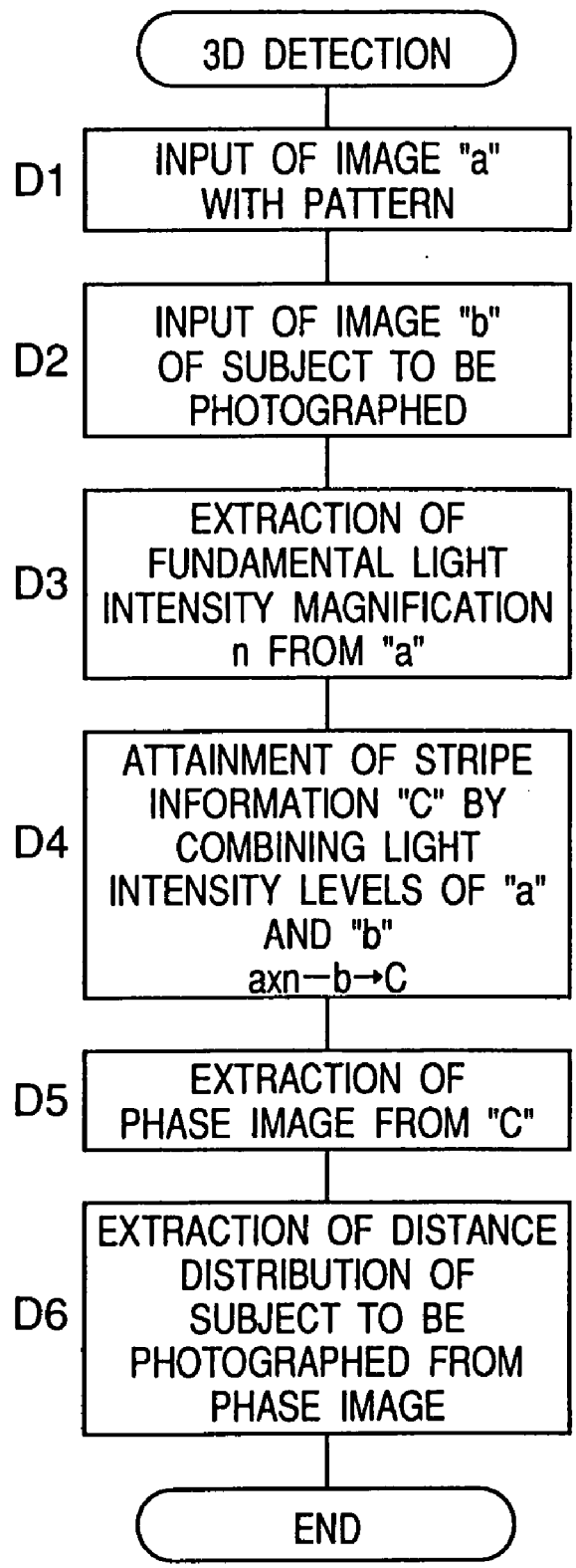
FIG. 18 is a flowchart showing an operation of the camera of FIG. 1, in which an image of the object is reproduced on the basis of information upon three-dimensional shape which is stored on a memory card set into a body of the camera.

It has been explained about the operation of the camera. The data for getting the information upon three-dimensional shape of the object is stored on the memory card 8. In order to reproduce the image of the object, the data is post-processed by a computer such as a personal computer. The process is carried out according to a flow chart as shown in FIG. 18, for example.

Figure 27:
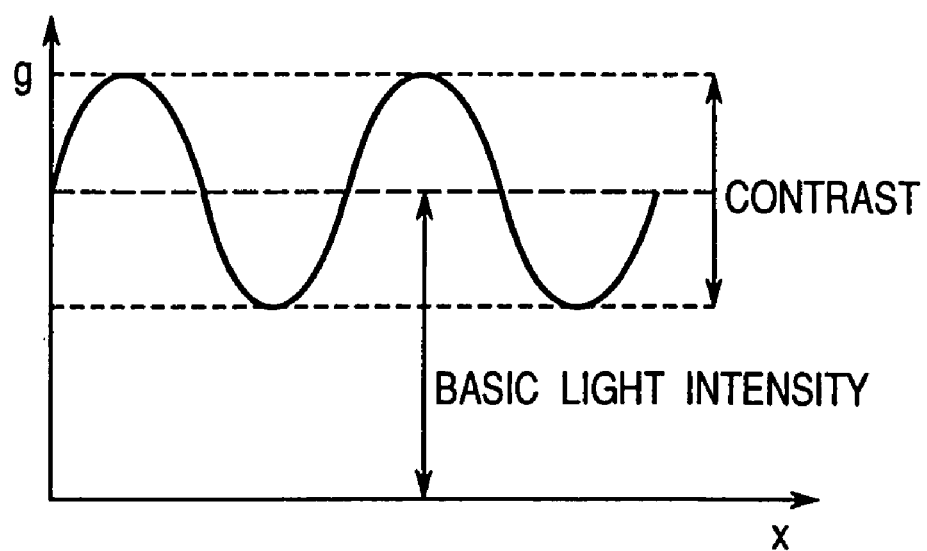
FIG. 27 is an explanatory view of prior art.
Figure 28:
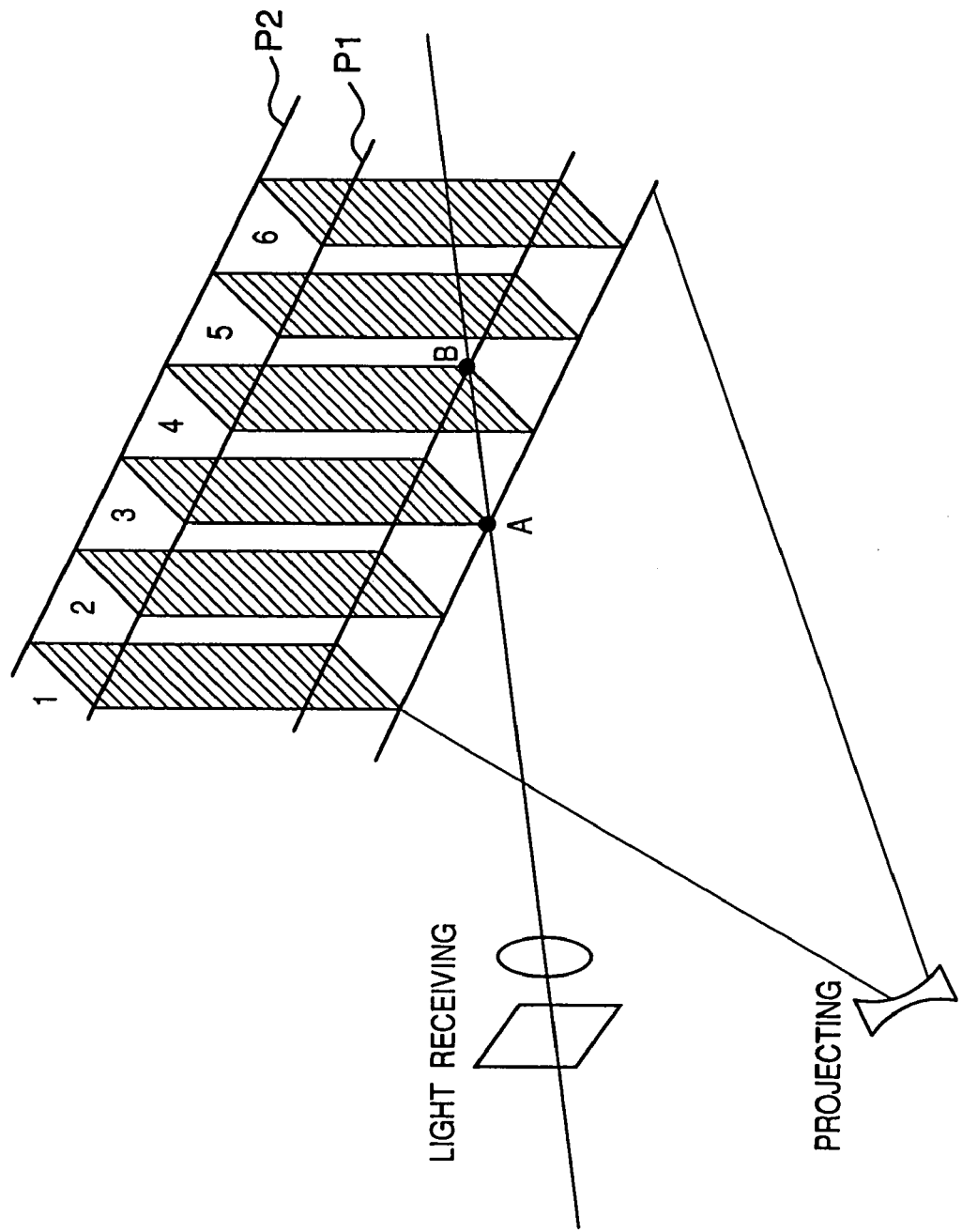
FIG. 28 is an explanatory view of prior art.

That is, after the memory card 8 is set into a personal computer (not shown), the data of the image "a" with the stripe pattern is inputted from the memory card 8 to the personal computer at step #D1, and then the data of the image "b" without the stripe pattern is inputted from the memory card 8 to the personal computer at step #D2. Information upon its fundamental light intensity is extracted from the image "a", and then fundamental light intensity magnification "n" with respect to the image "b" is determined at step #D3. The fundamental light intensity is image data that does not depend on the stripe pattern as shown in FIG. 27.

Then, by combining the fundamental light intensity levels of the image "a" and the image "b", only stripe pattern information "c" is gained at step #D4.

Then, a phase image with the gain being normalized, or standardized, on the basis of the stripe pattern information "c", is extracted at step #D5.

Then, a distance distribution of the object is computed from the phase image at step #D6. In this process, the position of the plurality of the sub-stripes of the stripe pattern is discriminated or identified. That is, it is possible to accurately determine or identify which ordinal number of sub-stripe the particular phase position corresponds to. In other words, it is possible to accurately match (or identify) the stripe pattern which is projected towards a particular object to be photograaphed and the stripe pattern which is reflected by the object, with each other. In this way, the distance up to the object, and the distance distribution, can be gained as correct information.

Alternatively, as a modification, in case of gaining the three-dimensional image, it is possible to make use of only information upon the distance distribution.

The camera, as described above, has an advantage that it is possible to gain information upon three-dimensional shape of the object, with a reduction in a drawback caused by a "camera blur" of an image of the object due to a movement, or shift, of the camera body, and/or with a reduction in a drawback caused by an "objective blur" of an image of the object due to a movement, or shift, of the object itself, while the photographer is taking an image of the object.

Although the present invention has been fully described in connection with the preferred embodiment thereof and the modifications to the embodiment with reference to the accompanying drawings, it is to be noted that various other changes are apparent to those skilled in the art.

For example, although it has been explained above about the embodiment of the digital camera, it is also possible to construct a camera employing a silver halide film such that an image with a stripe pattern and an image without the stripe pattern are taken on the silver halide film, and such that its post-processing is performed to form the three-dimensional image. In this arrangement, if the film data, after development, is digitized by a film scanner, and if it is captured into a computer such as a personal computer, then the post-processing is similar to that as explained above.

As a modification, alternatively, instead of employing the liquid crystal panels 540 and 545, an electrochromic element or an electroluminescence element, can be employed.

Such changes are also to be understood as included within the scope of the present invention as defined by the appended claims unless they depart therefrom.

What is claimed is:

1. A camera for getting information about a three-dimensional shape, comprising:
   an image capturing device for capturing an image of an object within a region to be photographed;
   a projector for projecting a light spreading on the region, the light having a predetermined pattern within a spreading area thereof; and
   a monitor for displaying the image of the object, the monitor having a memory for storing the image of the object that the image capturing device captures when the projector does not project the pattern light on the region;
   wherein the image capturing device captures a projection pattern formed on the object by the pattern light; and
   wherein, when the image capturing device captures the image of the object with the pattern light projected by the projector on the region, the monitor displays the image of the object captured without the pattern light and stored in the memory instead of the image of the object the image capturing device captures with the projector projecting the pattern light on the region so that the image of the object without the pattern can be observed although the object is being lightened by the pattern light.

2. The camera as claimed in claim 1, wherein the light spreading on the region is a non-uniform light and has a distribution of illuminance, and
   the projection pattern which is formed on the object within the region by the light spreading on the region comprises at least one stripe.

3. The camera as claimed in claim 1, wherein the light spreading on the region comprises a colored light, and
   the projection pattern that is formed on the object within the region by the light spreading on the region comprises a colored part.

4. A camera capable of getting information about a three-dimensional shape of an object, comprising:
   a projector for projecting a light spreading on the object and having a predetermined pattern within a spreading area thereof;
   a photographing part for photographing the object;
   a memory for storing an image of the object that the photographing part photographs in a state in which the projector does not project the light having the predetermined pattern on the object; and
   a display part for displaying the image of the object photographed without the pattern light and stored in the memory instead of the image of the object the photographing part photographs while the projector projects the light having the predetermined pattern on the object so that the image of the object without the pattern can be observed although the object is being lightened by the pattern light.

5. The camera as claimed in claim 4, wherein the display part displays the image of the object the photographing part photographs while the projector does not project the light having the predetermined pattern on the object.

6. The camera as claimed in claim 4, wherein the light having the predetermined pattern is a non-uniform light and has a distribution of illuminance, and
   a projection pattern that is formed on the object by the light having the predetermined pattern comprises at least one stripe.

7. The camera as claimed in claim 4, wherein the light having the predetermined pattern comprises a colored light, and
   a projection pattern that is formed on the object by the light having the predetermined pattern comprises a colored part.

8. A camera capable of getting information about a three-dimensional shape of an object, comprising:
   an image taking part for successively taking images of the object;
   a first memory for successively and temporarily storing the images of the object the image taking part takes;
   a display part for renewing and displaying the images of the object successively; and
   a projector for projecting a light spreading on the object with a predetermined pattern within a spreading area thereof;
   wherein the display part displays the image of the object captured and stored in the first memory prior to a projection of the light with the predetermined pattern by the projector instead of the image of the object the image taking part takes when the image taking part takes the image of the object in a state in which the projector projects the light with the predetermined pattern so that the image of the object without the pattern can be observed although the object is being lightened by the pattern light.

9. The camera as claimed in claim 8, further comprising a second memory for storing the images of the object the image taking part takes, the second memory outputting the stored images of the object to the first memory successively.

10. The camera as claimed in claim 9, wherein the second memory stores the image of the object the image taking part takes, and the image of the object stored in the second memory is prohibited from being outputted to the first memory when the image taking part takes the image of the object in the state in which the projector projects the light with the predetermined pattern.

11. The camera as claimed in claim 8, wherein the display part is prohibited from renewing the image of the object when the image taking part takes the image of the object in the state in which the projector projects the light with the predetermined pattern.

12. The camera as claimed in claim 8, wherein the light with the predetermined pattern is a non-uniform light and has a distribution of illuminance, and a projection pattern that is formed on the object by the light with the predetermined pattern comprises at least one stripe.

13. The camera as claimed in claim 8, wherein the light with the predetermined pattern comprises a colored light, and a projection pattern that is formed on the object by the light with the predetermined pattern comprises a colored part.

\* \* \* \* \*